(12) United States Patent
Ichikawa et al.

(10) Patent No.: US 12,734,965 B2
(45) **Date of Patent: *Sep. 15, 2026**

(54) IMAGE DISPLAY SYSTEM AND DISPLAY CONTROL DEVICE

(71) Applicants: KABUSHIKI KAISHA TOKAI-RIKA-DENKI-SEISAKUSHO, Niwa-gun (JP); SUZUKI MOTOR CORPORATION, Hamamatsu-Shizuoka (JP)

(72) Inventors: Tomonori Ichikawa, Aichi (JP); Furuna Yamamoto, Aichi (JP); Toshinari Nakai, Aichi (JP); Takuya Kuriyama, Hamamatsu-Shizuoka (JP); Yuichi Nakajima, Hamamatsu-Shizuoka (JP)

(73) Assignees: KABUSHIKI KAISHA TOKAI-RIKA-DENKI-SEISAKUSHO, Niwa-gun (JP); SUZUKI MOTOR CORPORATION, Hamamatsu-Shizuoka (JP)

( * ) Notice: Subject to any disclaimer, the term of this patent is extended or adjusted under 35 U.S.C. 154(b) by 28 days.

This patent is subject to a terminal disclaimer.

(21) Appl. No.: 18/390,832

(22) Filed: Dec. 20, 2023

(65) Prior Publication Data

US 2024/0208417 A1 Jun. 27, 2024

(30) Foreign Application Priority Data

Dec. 23, 2022 (JP) ................................ 2022-207661
Jul. 13, 2023 (JP) ................................ 2023-115474

(51) Int. Cl.
*B60R 1/26* (2022.01)
*B62J 29/00* (2006.01)
(Continued)

(52) U.S. Cl.
CPC ................ *B60R 1/26* (2022.01); *B62J 29/00* (2013.01); *B62J 45/20* (2020.02); *B62J 50/22* (2020.02);
(Continued)

(58) Field of Classification Search
None
See application file for complete search history.

(56) References Cited

U.S. PATENT DOCUMENTS

2014/0347489 A1* 11/2014 Kumon .................. B60K 35/00 348/148
2017/0163863 A1* 6/2017 Gomez Timoneda .... B60R 1/26
(Continued)

FOREIGN PATENT DOCUMENTS

JP 2008100596 A 5/2008

*Primary Examiner* — Rebecca A Volentine
(74) *Attorney, Agent, or Firm* — Dority & Manning, PA

(57) ABSTRACT

An image display system includes: rearview optical mirrors of a motorcycle; an image capture device that captures image of the area behind the motorcycle; a display device that is disposed in front of a rider and displays image based on image data obtained by the image capture device; and a control device which, when the motorcycle, as a vehicle, is driving, controls the display device to display a first screen that displays a first image corresponding to a first area of an imaging range of the image captured by the image capture device and thereafter transition a screen displayed on the display device from the first screen to a second screen that displays a second image corresponding to a second area different from the first area, wherein each of the first area and the second area includes a blind spot area that cannot be seen by the rider in the optical mirrors.

10 Claims, 29 Drawing Sheets

(51) Int. Cl.
*B62J 45/20* (2020.01)
*B62J 50/22* (2020.01)

(52) U.S. Cl.
CPC . *B60R 2300/306* (2013.01); *B60R 2300/8026* (2013.01)

(56) References Cited

U.S. PATENT DOCUMENTS

2019/0347490 A1* 11/2019 Iida .......................... B60R 1/28
2021/0099662 A1* 4/2021 Arakawa ................. G09G 5/14
2023/0365064 A1* 11/2023 Suzuki ..................... B60R 1/27

* cited by examiner

DISPLAY DEVICE
14
DISPLAY UNIT
40
OPERATION UNIT
42
SENSOR
44
SPEAKER
46
OPERATION DEVICE
18
COMMUNICATION UNIT
22
STORAGE UNIT
24
EXTERNAL DEVICE
28
CONTROL DEVICE
16
CPU
30
ROM
32
RAM
34
MEMORY
36
IMAGE CAPTURE DEVICE
12
MICROPHONE
26
SENSORS
20

IMAGE DISPLAY SYSTEM AND DISPLAY CONTROL DEVICE

CROSS-REFERENCE TO RELATED APPLICATIONS

This application claims priority under 35 USC 119 from Japanese Patent Application No. 2022-207661, filed on Dec. 23, 2022, and Japanese Patent Application No. 2023-115474, filed on Jul. 13, 2023. The entire disclosure of each of the above applications is incorporated herein by reference.

BACKGROUND

Technical Field

The present disclosure relates to an image display system and a display control device.

Related Art

Conventionally, technologies are known where a rear view image capturing the area behind a two-wheeled vehicle is displayed on a display device to provide visual information about the area behind the two-wheeled vehicle to the rider. According to image capture devices including a wide-angle lens, a wide range area behind the two-wheeled vehicle can be captured, but when a rear view image capturing the wide range area is displayed on the display device, there is the problem of reduced visibility because the size of the following vehicle in the image is small.

To address this problem, Japanese Patent Application Laid-open (JP-A) No. 2008-100596 discloses a technology where an image including the direction directly behind the vehicle and an image including left and right blind spot directions are extracted (i.e. cut out) from a rear view image including a wide range area, and the images are switched between and displayed, whereby each image is displayed in an image size with which the rider may easily identify it.

The area directly behind the rider that is hidden by the body of the rider is a blind spot that cannot be seen in optical mirrors. However, if the cut-out range of the image is slid left and right as in the technology disclosed in JP-A No. 2008-100596, there is the potential for part or all of the blind spot area located directly behind the rider to not be displayed.

SUMMARY

It is an object of the present disclosure to provide an image display system and a display control device that can cut out image in which the blind spot directly behind the rider is reducible. The "image" in this disclosure include video and stationary image.

An image display system of a first aspect of the disclosure includes: rearview optical mirrors of a motorcycle, which is a host vehicle; an image capture device that captures an image of an area behind the motorcycle; a display device that is disposed in front of a rider and displays an image based on image data obtained by the image capture device; and a control device which, when the motorcycle is travelling, controls the display device so as to display a first screen that displays a first image corresponding to a first area of an imaging range of the image captured by the image capture device and to thereafter effect a transition from the first screen to a second screen that displays a second image corresponding to a second area that is different from the first area, wherein each of the first area and the second area includes a blind spot area that cannot be seen by the rider in the optical mirrors.

An image display system of a second aspect of the disclosure is the image display system of the first aspect of the disclosure, wherein the blind spot area corresponds to the vehicle width of the host vehicle, and extends in a direction directly rearward of the host vehicle.

An image display system of a third aspect of the disclosure is the image display system of the first aspect of the disclosure, wherein the blind spot area is set by the rider.

An image display system of a fourth aspect of the disclosure is the image display system of the first aspect of the disclosure, wherein each of the first area and the second area is a rectangular area wherein a lower side of each area intersects respective side ends of the blind spot area that cannot be seen by the rider in the optical mirrors.

An image display system of a fifth aspect of the disclosure is the image display system of the first aspect of the disclosure, wherein the first image is displayed at a magnification that is closer to a magnification of the optical mirrors than a magnification of the captured image, and the second area has a wider area, on a same side as a direction designated by the rider, than the first area.

An image display system of a sixth aspect of the disclosure is the image display system of the first aspect of the disclosure, wherein the second area has a wider area on a turn side than the first area, and the control device controls the display device so as to transition from the first screen to the second screen in conjunction with an operation of a turn switch installed in the motorcycle.

An image display system of a seventh aspect of the disclosure is the image display system of the first aspect of the disclosure, wherein the second area has a wider area, on a side at which another vehicle has been detected, than the first area, and the control device controls the display device so as to transition from the first screen to the second screen in conjunction with detection results of a blind spot monitor installed in the motorcycle.

An image display system of an eighth aspect of the disclosure is the image display system of the first aspect of the disclosure, wherein the control device controls the display device so as to transition from the first screen to the second screen in conjunction with the host vehicle having stopped or the host vehicle having started driving.

An image display system of a ninth aspect of the disclosure is the image display system of the first aspect of the disclosure, wherein the control device controls the display device so as to transition from the first screen to the second screen via at least one third screen that displays a third image corresponding to a third area, that is wider than the first area and narrower than the second area, of the imaging range of the image captured by the image capture device, wherein, during the transition from the first screen to the second screen, the magnification of the image displayed on each screen is gradually increased so that the first image continuously changes to the second image.

An image display system of a tenth aspect of the disclosure is the image display system of the first aspect of the disclosure, wherein, in the second image: a fourth area corresponding to a maximum width of the blind spot area in the second area is displayed at a same magnification as that of the first image and areas other than the fourth area in the second area are compressed in the vehicle width direction and displayed.

An image display system of an eleventh aspect of the disclosure is the image display system of the first aspect of the disclosure, wherein the control device controls the display device so as to superimpose and display on the second image at least one of a frame indicating the first area corresponding to the first image or an icon indicating that the second image is currently being displayed when displaying the second screen including the second image.

A display control device of a twelfth aspect of the disclosure is the display control device that controls a display device arranged together with optical mirrors in front of a rider of a motorcycle, the display control device comprising a memory and a processor coupled to the memory, wherein the processor is configured to: acquire image data from an image capture device that captures an image of an area behind the motorcycle when the motorcycle, which is a host vehicle, is travelling; control, based on the acquired video data, the display device so as to display a first screen that displays a first image corresponding to a first area of an imaging range of the image data; and control the display device so as to effect transition from the first screen to a second screen that displays a second image corresponding to a second area that different from the first area, wherein each of the first area and the second area includes a blind spot area that cannot be seen by the rider in the optical mirrors.

A display control device of a thirteenth aspect of the disclosure is the display control device of the twelfth aspect of the disclosure, wherein the blind spot area corresponds to the vehicle width of the host vehicle, and extends in a direction directly rearward of the host vehicle.

A display control device of a fourteenth aspect of the disclosure is the display control device of the twelfth aspect of the disclosure, wherein the blind spot area is set by the rider.

According to the image display system of the first aspect of the disclosure and the display control device of a twelfth aspect of the disclosure, the blind spot directly behind the rider can be reduced.

According to the image display system of the second aspect of the disclosure and the display control device of a thirteenth aspect of the disclosure, an image in which the blind spot directly behind the rider is reducible can be cut out.

According to the image display system of the third aspect of the disclosure and the display control device of a fourteenth aspect of the disclosure, the blind spot area can be reduced regardless of the build of the rider and the installation conditions of the optical mirrors.

According to the image display system of the fourth aspect of the disclosure, the blind spot area can be objectively defined.

According to the image display system of the fifth aspect of the disclosure, a wide range rear image on the turn side (the second image) can be displayed while maintaining a sense of the distance to a following vehicle and a sense of the size of the following vehicle, and a rear image including a wide range area on the turn side can be displayed.

According to the image display system of the sixth aspect of the disclosure, the screen is automatically switched in response to situations such as changing course and making a right or left turn, so the number of times that the rider performs switch operations can be reduced, and the rider can look at the image of the rear area on the turn side that the rider wants to check when changing course or making a right or left turn.

According to the image display system of the seventh aspect of the disclosure, the screen is automatically switched in response to the detection results of the blind spot monitor, so the number of times that the rider performs switch operations can be reduced, and the rider can, in a case where a vehicle is approaching the host vehicle diagonally from the rear, look at an image of the side where the detected vehicle is when the other vehicle has approached from the rear.

According to the image display system of the eighth aspect of the disclosure, the number of times that the rider performs switch operations can be reduced.

According to the image display system of the ninth aspect of the disclosure, it becomes easy for the rider to perceive changes in the image, and it becomes easy to maintain a sense of the distance to the following vehicle and a sense of the size of the following vehicle.

According to the image display system of the tenth aspect of the disclosure, a rear image including a wide range area on the turn side (the second image) can be displayed while the blind spot area directly behind the rider is displayed as is at the same magnification as the standard image (the first image).

According to the image display system of the eleventh aspect of the disclosure, it becomes easy to recognize which of the standard image (the first image) and the rear image including a wide range area on the turn side (the second image) is being displayed.

BRIEF DESCRIPTION OF THE DRAWINGS

The foregoing and other objects, features, and advantages of the disclosure will become more apparent from the following detailed description considered together with the accompanying drawings, in which:

FIG. 4 is a functional block diagram showing an example of functional configurations of a control device according to the first embodiment of the disclosure;

FIG. 5 is a flowchart showing an example of the flow of processes in an image display program according to the first embodiment of the disclosure;

DETAILED DESCRIPTION

Exemplary embodiments of the present disclosure will now be described in detail below with reference to the drawings.

First Embodiment

The image display system of the disclosure is an image display system for a motorcycle, and displays rear view image of the area behind the host vehicle to the rider. Here, "motorcycle" means two-wheeled motorcycles, three-wheeled motorcycles, or four-wheeled motorcycles among saddle-style vehicles that a rider rides by straddling the vehicle. This includes motorcycles that use an engine as a drive source and motorcycles that use a motor as a drive source. Examples of motorcycles include motorbikes, scooters, and electrically powered scooters. Below, a case where the motorcycle is a two-wheeled motorcycle will be described.

(Configuration of Image Display System)

First, the configuration of the image display system will be described.

Figure 1:
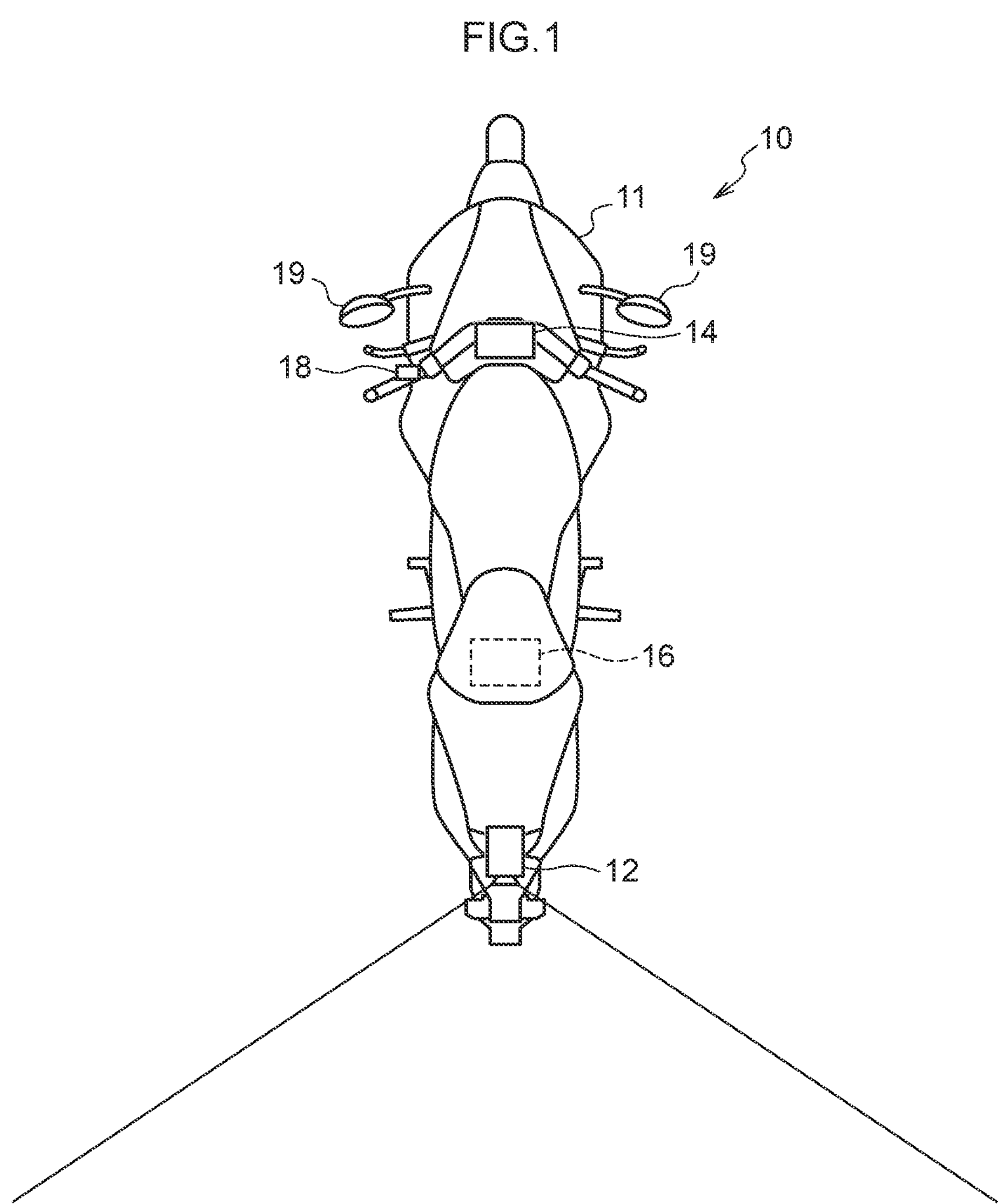
FIG. 1 is a schematic view showing an example of the configuration of an image display system according to a first embodiment of the disclosure.

FIG. 1 is a schematic view showing an example of the configuration of an image display system 10. As shown in FIG. 1, the image display system 10 includes an image capture device 12, a display device 14, a control device 16, an operation device 18, and optical mirrors 19. Although FIG. 1 shows one each of each device, the image display system 10 may be provided with more than one each of the image capture device 12, the display device 14, and the operation device 18. The optical mirrors 19 are rearview optical mirrors, and one each is provided on both left and right sides as vehicle equipment.

The image capture device 12 is a device that captures rear view image of the area behind a vehicle body 11 of the motorcycle. The image capture device 12 may be a camera with an angle of view less than 60 degrees or a camera including a wide-angle lens with an angle of view equal to or greater than 60 degrees. As the image capture device 12, for example, a digital video camera including an image sensor such as a CCD image sensor or a CMOS image sensor can be used.

The display device 14 is a device that displays rear view image of the area behind the vehicle to the rider. As a display unit 40 of the display device 14 (see FIG. 3), for example, a display such as a liquid crystal display, an organic EL display, or a touch panel display having a configuration where a touch panel is overlaid on these displays can be used. The display device 14 is installed in a position in front of a rider in which it is easy for the rider to see it.

Figure 2:
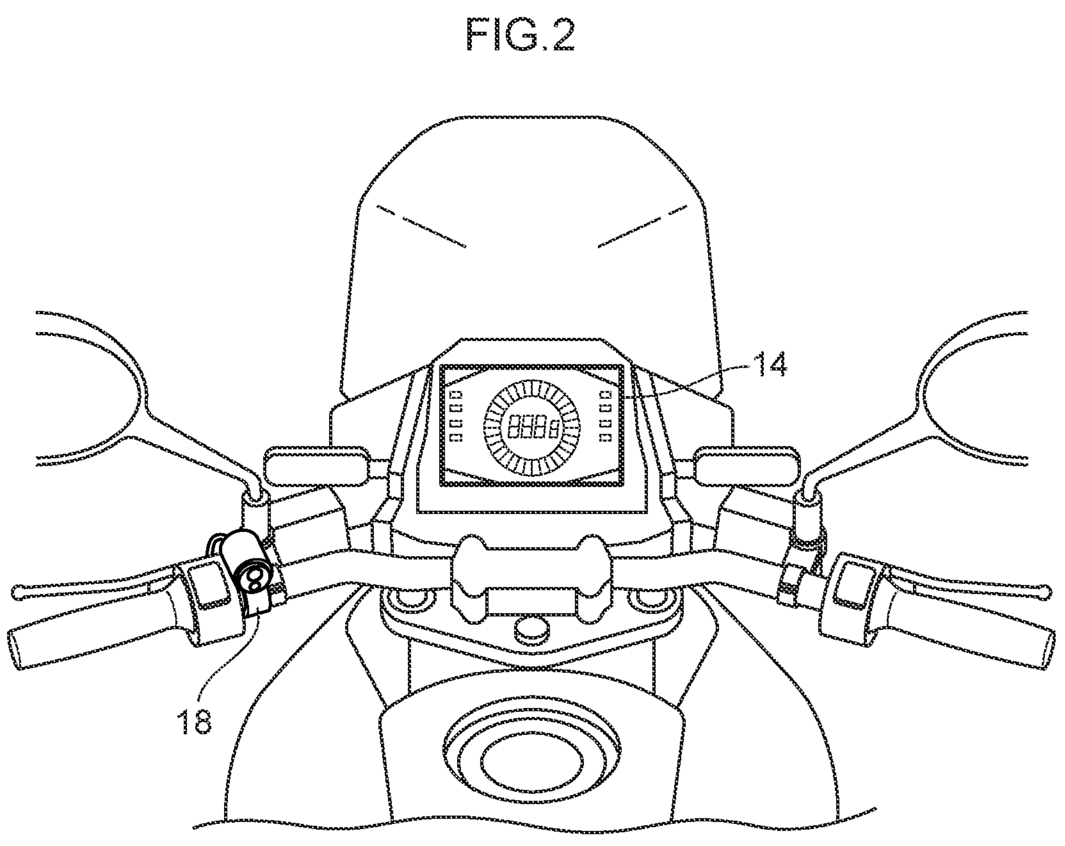
FIG. 2 is a schematic view showing an example of the arrangement of a display device and an example of an operation device.

As the display device 14, a display built in the instrument panel of the vehicle body 11 may be used or an add-on display may be used. For example, as shown in FIG. 2, when a built-in display is used, the display device 14 can be disposed in the center of the instrument panel. Furthermore, when an add-on display is used, the display device 14 can be disposed near the meter display. In this case, the distance from the rider to the meters (e.g., the meter display) and the distance from the rider to the display device 14 can be made substantially the same, whereby it becomes easy for the rider to focus on the display device 14.

The control device 16 is a control function unit of an electronic control unit (ECU) provided for controlling the display device 14. The control device 16 is installed inside the vehicle body 11 by, for example, embedding it inside the seat.

The operation device 18 is a device for the rider to input operations. As the operation device 18, for example, a handle switch attached near a handle can be used. According to the handle switch, the rider can input operations even while driving. The operation device 18 may, for example, be a push button switch as shown in FIG. 2, and the push button switch can be attached to the left grip. Furthermore, as described later, a turn switch can also be used as the operation device 18.

(Electrical Configurations of Image Display System)

Next, electrical configurations of the image display system 10 will be described.

Figure 3:
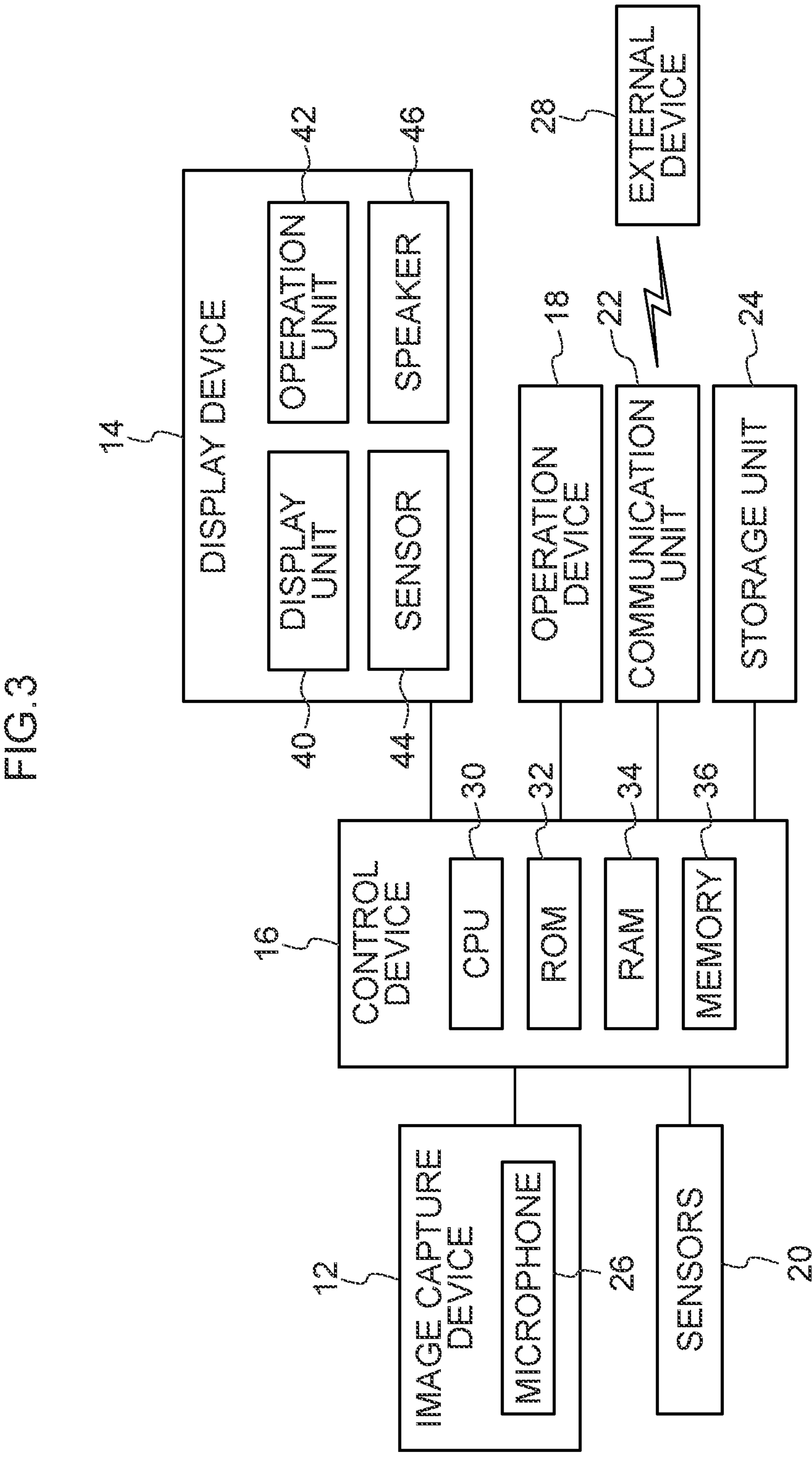
FIG. 3 is a block diagram showing an example of electrical configurations of the image display system according to the first embodiment of the disclosure.

FIG. 3 is a block diagram showing an example of the electrical configurations of the image display system 10. The control device 16 includes a central processing unit (CPU) 30, a read-only memory (ROM) 32, a random-access memory (RAM) 34, and a nonvolatile memory 36. Prestored in the ROM 32 or the nonvolatile memory 36 is an image display program described later. The CPU 30 reads the prestored program and executes the program using the RAM 34 as a work area.

The image capture device 12, the display device 14, and the operation device 18 are connected by wires or wirelessly to, so as to be capable of exchanging data with, the control device 16. Furthermore, various sensors 20, a communication unit 22, and a storage unit 24 are also connected by wires or wirelessly to, so as to be capable of exchanging data with, the control device 16. The control device 16 exchanges information with and controls each unit.

The sensors 20 include, for example, an inclination sensor for detecting inclination of the vehicle body 11 and an acceleration sensor. The communication unit 22 is an interface for communicating with an external device 28. The storage unit 24 is an external storage device such as a hard disk drive (HDD) or a memory card (e.g., an SD card). In the storage unit 24 are stored image data of various screens described later. The control device 16 is housed in a case together with the communication unit 22 and the storage unit 24 and is installed inside the vehicle body 11 as an ECU.

The display device 14 includes a display unit 40, an operation unit 42, a sensor 44, and a speaker 46. The display unit 40 is a display for displaying image based on image data. The operation unit 42 is a switch or a button for inputting operations. The sensor 44 is an acceleration sensor for detecting the orientation of the display device 14. The speaker 46 is a device that outputs audio based on audio data.

The configurations described above are examples, and new members can also be added thereto and some members can also be omitted therefrom. For example, the image display system 10 may include a microphone 26 for picking up audio around the vehicle. The microphone 26 may, for example, be a microphone built into the image capture device 12 as shown in FIG. 3.

Here, the operation of the image display system 10 will be briefly described.

Rear view image of the area behind the vehicle is captured by the image capture device 12, and the obtained image data are output to the control device 16. The control device 16 processes the obtained image data and outputs the image data to the display device 14. The display device 14 displays image based on the obtained image data.

Furthermore, the rider can give various instructions via the operation device 18, such as, for example, an instruction to switch the screen displayed on the display device 14. The control device 16 switches, for example, a screen that displays a standard image at the same magnification as the optical mirrors to a screen that displays a wide range image in which a turn side is wide in response to an instruction from the rider. It will be noted that the input of operations by the rider can also be performed via the operation unit 42 of the display device 14 and can also be performed via an operation screen displayed on the display unit 40 of the display device 14.

It will be noted that the screen that displays the standard image corresponds to "a first screen that displays a first image corresponding to a first area" of the disclosure, and the screen that displays the wide range image in which the turn side is wide corresponds to "a second screen that displays a second image corresponding to a second area" of the disclosure.

(Functional Configurations of Control Device)

Next, functional configurations of the control device 16 will be described.

Figure 4:
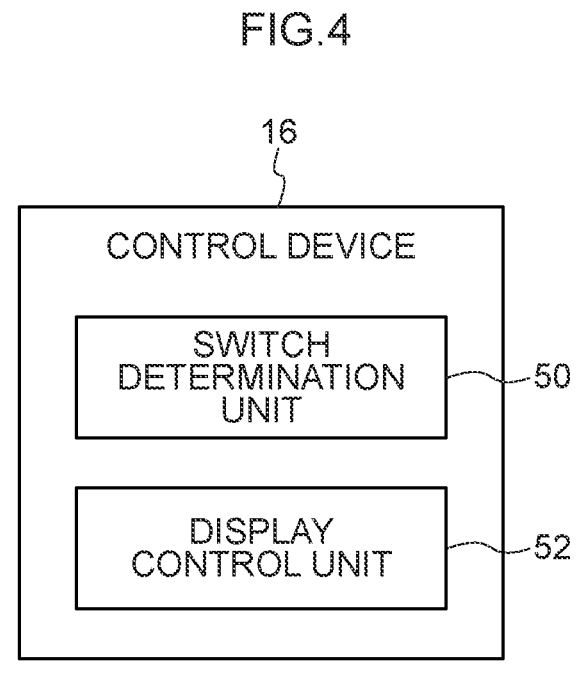

FIG. 4 is a functional block diagram showing an example of the functional configurations of the control device 16. The control device 16 includes a switch determination unit 50 and a display control unit 52. These functional units are realized as a result of the image display program described later being executed by the CPU 30 of the control device 16.

(Image Display Program)

Next, the image display program will be described.

Figure 5:
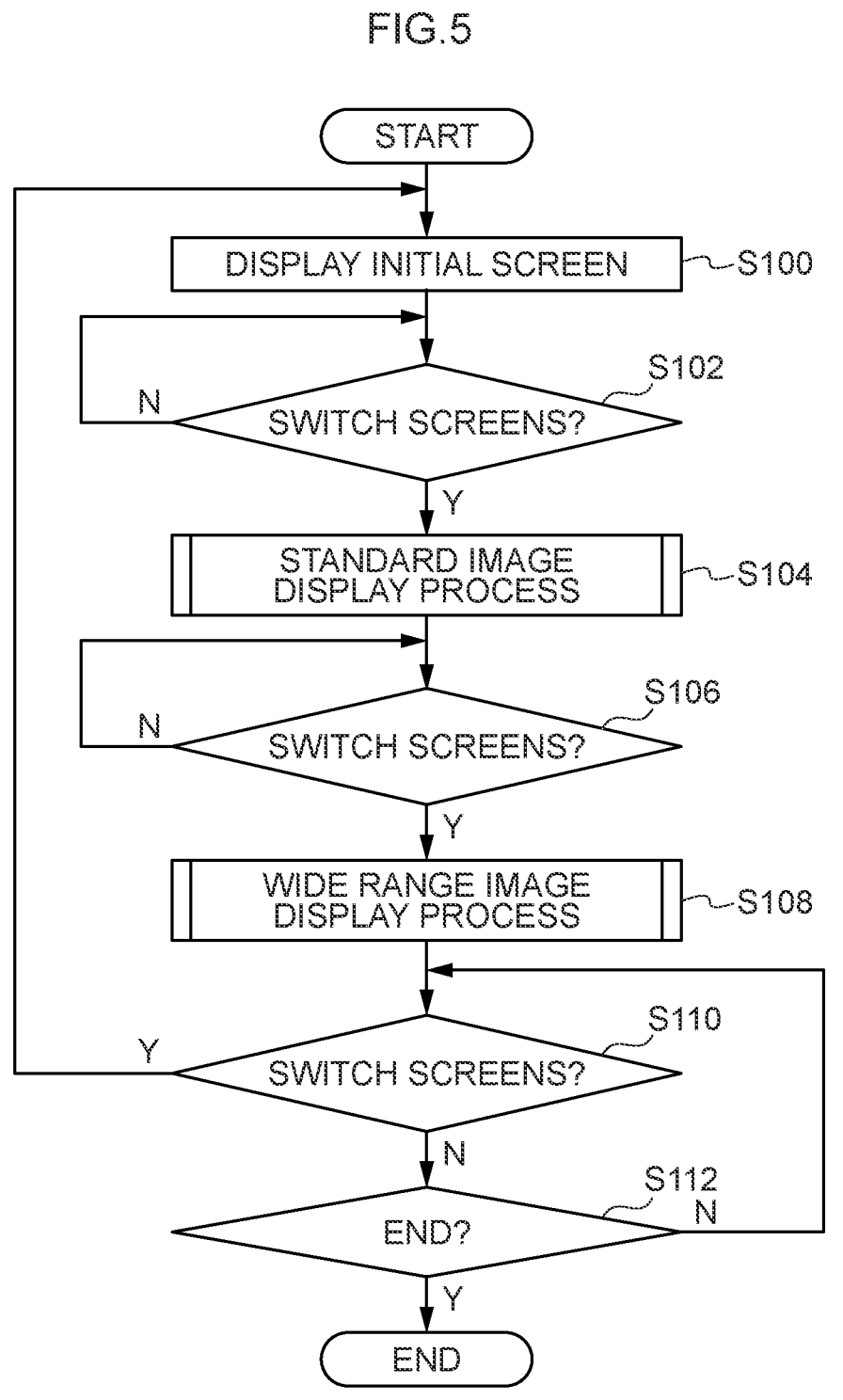

FIG. 5 is a flowchart showing an example of the flow of processes in the image display program. The image display program is executed by the CPU 30 of the control device 16 and is started when the display device 14 is turned on. Here, excluding step S112, the operations of the CPU 30 will be described as operations of the functional units shown in FIG. 4.

In the first embodiment, the operation device 18 is a dedicated switch for giving an instruction to switch screens. The operation device 18 can, for example, be the push button switch shown in FIG. 2. When the rider pushes the button, the screen displayed on the display device 14 is sequentially switched. There are cases where the rider wants to see a wide range image including an area in which the turn side is wide in the imaging range of the captured image. In the present embodiment, the rider can give an instruction to switch the display screen to a screen that displays such a wide range image.

It will be noted that instructions to turn the display device 14 on and off may be given by operating a switch such as an engine starter switch. Alternatively, instructions to turn the display device 14 on and off may be given by operating other switch included the operation device 18, such as, for example, pushing a different button or changing the way in which the button is pushed.

First, in step S100 the display control unit 52 causes the display device 14 to display an initial screen. When the display device 14 is turned on, first, the initial screen is displayed. The initial screen is a screen on which image is not displayed; for example, it can be a vehicle information screen on which vehicle information, such as vehicle speed, mileage, engine speed, water temperature, and remaining fuel amount, for example, is displayed. Furthermore, the initial screen may be a screen on which nothing is displayed.

Next, in step S102 the switch determination unit 50 determines whether or not an instruction to switch screens has been given during display of the initial screen. When an instruction to switch screens has been given, the process proceeds to step S104. When an instruction to switch screens has not been given, the process returns to step S102 and the switch determination unit 50 repeatedly determines whether or not an instruction to switch screens has been given until an instruction is given.

Figure 6A:
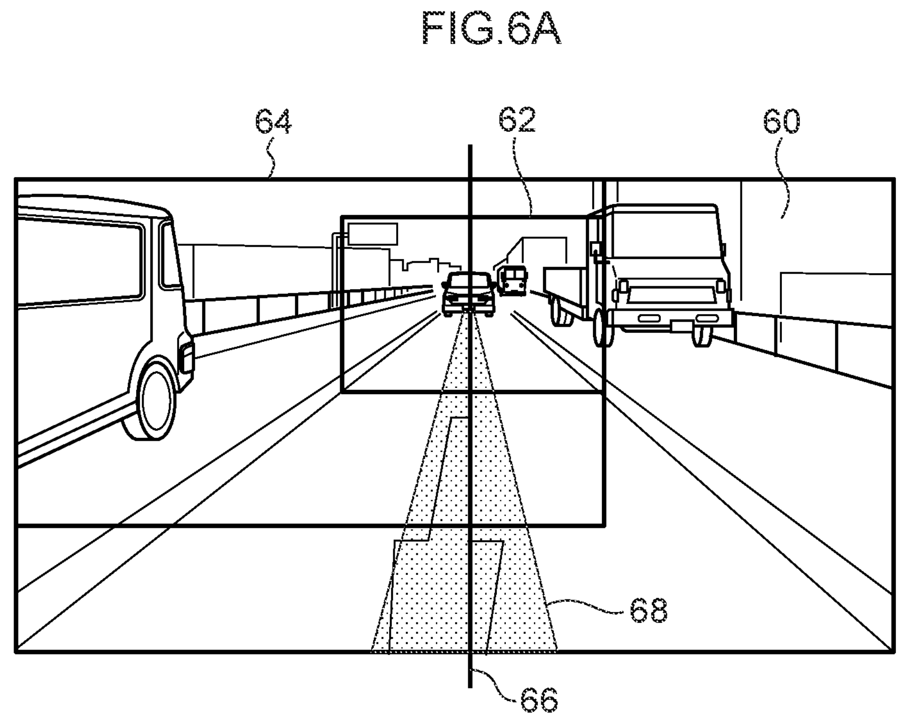
FIG. 6A is a schematic diagram showing a standard image and a wide range image.

Next, in step S104 the display control unit 52 executes a standard image display process that switches the display screen to a screen that displays a standard image. A standard image 71 shown in FIG. 6C is an image obtained by cutting out a partial area 62 from an imaging range of a captured image 60 as shown in FIG. 6A and inverting it. The standard image 71 is displayed at a magnification whereby the displayed image has the same size as that of a mirror image in an optical mirror so that the rider may easily grasp a sense of the distance to a following vehicle and a sense of the size of the following vehicle. Furthermore, the reason the display device 14 displays an inverted image is that displaying image with the same orientation as that of a mirror image appearing in a rearview optical mirror allows the rider to easily grasp the situation behind the vehicle.

Figure 6B:
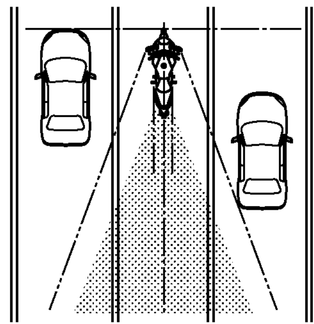
FIG. 6B is a view of a vehicle seen from above.
Figure 6C:
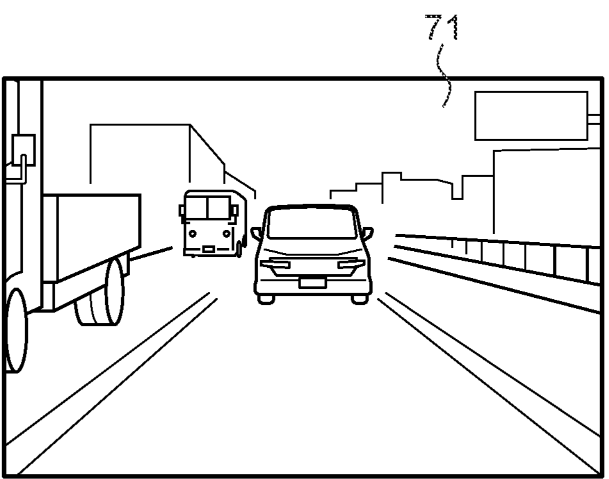
FIG. 6C is a schematic diagram showing the standard image.

FIG. 6B is a view of the vehicle seen from above. The dash-double-dot lines extending from the rearview optical mirrors represent the field of view of the optical mirrors, and the dash-double-dot lines extending directly behind the vehicle represent the blind spot area directly behind the vehicle. Furthermore, the shaded area represents the cut-out range of the standard image 71.

The image capture device 12 captures a wide range of the area behind the vehicle, but what the rider wants to see is the area that is the blind spot directly behind the rider. At the same time, the rear view image is captured so that this blind spot area directly behind the rider appears in the center of the imaging range. Consequently, the area 62 including the central portion of the imaging range is cut out as the display range. By cutting out and displaying the partial area 62, the range that the rider wants to see can be displayed large in the standard image 71 as shown in FIG. 6C.

In FIG. 6A, an area 68 (the stippled portion) represents the blind spot area corresponding to the vehicle width behind the vehicle. "Vehicle width" here is the width of the vehicle at its widest part, and is usually called "overall width." The overall width is measured at the outermost shape of the vehicle excluding the mirrors. The area 68 is an isosceles triangle whose apex is a vanishing point and which is symmetrical relative to a vehicle centerline 66, and its width becomes narrower heading toward the upper side of the screen (i.e., the far side). This area 68 substantially coincides with the blind spot area directly behind the rider. In the present embodiment, by objectively defining the blind spot area directly behind the rider in this way, the blind spot area directly behind the rider is invariably included in the cut-out range. Because of this, the blind spot directly behind the rider can be reduced. Hereinafter, the area 68 will be called the blind spot area 68.

It will be noted that the vehicle width direction in real space corresponds to the left and right direction on the display image. For this reason, in the description of the image, sometimes the vehicle width direction will be called "the left and right direction."

Figure 7A:
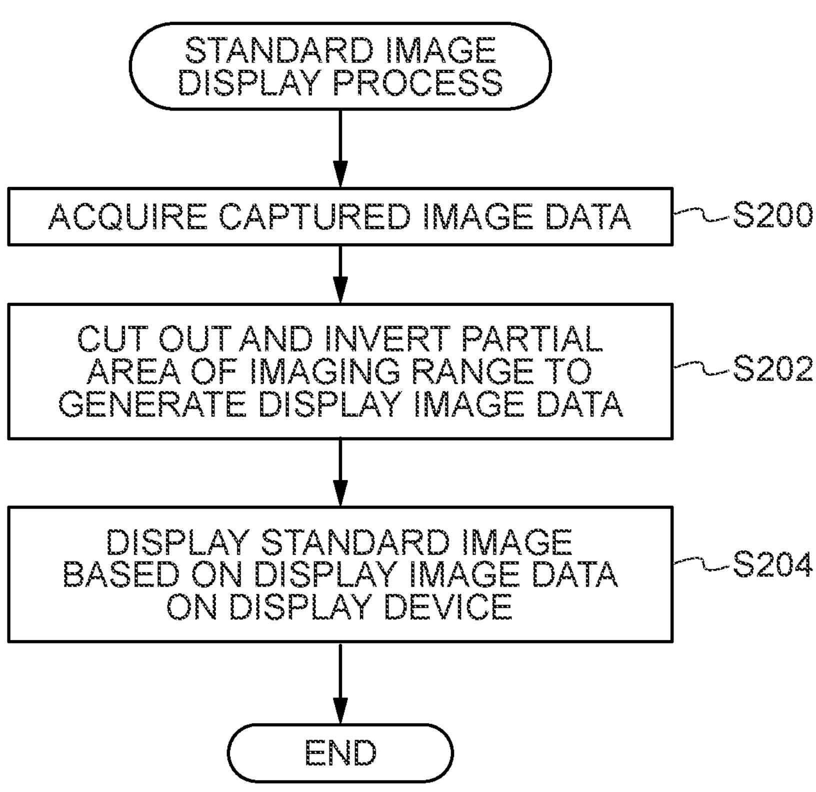
FIG. 7A is a flowchart showing an example of the flow of a standard image display process.

Here, the flow of the standard image display process will be described. As shown in FIG. 7A, the display control unit 52 acquires the image data from the image capture device 12 (step S200). Here, the unprocessed image data obtained from the image capture device 12 will be called captured image data. Next, the display control unit 52 performs image processing on the captured image data so as to cut out a partial area of the imaging range as the display range and horizontally invert the image in the display range to thereby generate image data for display to be displayed on the display device 14 (step S202). Here, the image data for display will be called display image data. Next, the display control unit 52 outputs the display image data to the display device 14 and causes the display device 14 to display image based on the display image data (step S204).

In the cutting-out of the display range in step S202, first, the display control unit 52 identifies the blind spot area 68 in the captured image. The position of the blind spot area 68 on the image can be found by a perspective projection camera model. Next, the display control unit 52 decides the cut-out range so that the lower side of the rectangular area 62 intersects both side ends of the blind spot area 68 and so as to include the vanishing point of the blind spot area 68 (see FIG. 6A). By deciding the cut-out range in this way, the display control unit 52 can include the blind spot area 68 in the area 62.

It will be noted that when generating the display image data, the display control unit 52 may perform image processing such as rotation correction, distortion correction, color correction, and denoising.

Returning to FIG. 5, next, in step S106 the switch determination unit 50 determines whether or not an instruction to switch screens has been given during display of the standard image. When an instruction to switch screens has been given, the process proceeds to step S108. When an instruction to switch screens has not been given, the process returns to step S106 and the switch determination unit 50 repeatedly determines whether or not an instruction to switch screens has been given until an instruction is given.

Figure 6D:
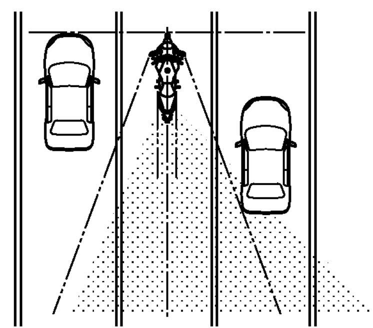
FIG. 6D is a view of the vehicle seen from above.
Figure 6E:
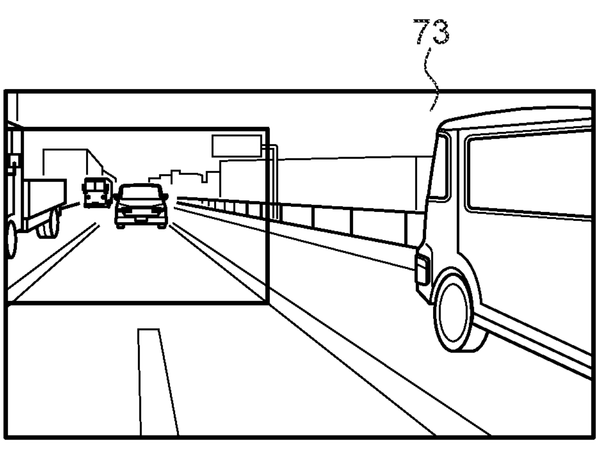
FIG. 6E is a schematic diagram showing the wide range image.

Next, in step S108 the display control unit 52 executes a wide range image display process that switches the display screen to a screen that displays a wide range image in which the turn side is wide. A wide range image 73 in which the turn side is wide shown in FIG. 6E is an image obtained by cutting out and inverting an area 64 so that the turn side of the imaging range of the captured image 60 is wide as shown in FIG. 6A. This example is a case where the vehicle makes a right turn, so the area 64 is an area where the right side is wide relative to the vehicle traveling direction and where the left side is wide in FIG. 6A which is an inverted image. The area 64 includes the area 62 that is cut out as the standard image. By switching to the screen that displays the wide range image 73, the rider can look at the rear view image on the turn side that the rider wants to check when making a right or left turn.

As described above, in the present embodiment, the blind spot area 68 directly behind the rider is invariably included in the area 64. Because of this, the blind spot directly behind the rider can be reduced even when the wide range image 73 in which the turn side is wide is displayed. FIG. 6D is a view of the vehicle seen from above. The shaded area represents the cut-out range of the wide range image 73. As will be understood from FIG. 6D, the wide range image 73 includes the blind spot area 68 directly behind the rider and also includes the blind spot area on the turn side.

Furthermore, by cutting out and displaying a partial area of the captured image 60 also when displaying the wide range image 73, magnification can be increased compared with a case where the entire imaging range is displayed. In the wide range image 73 in which the turn side is wide, the following vehicle and the like are displayed in a larger size, so visibility is improved. Furthermore, there is less of a change in magnification from the standard image 71 than there is in a case where the entire imaging range is displayed, so it becomes easy for the rider to maintain a sense of the distance to the following vehicle and a sense of the size of the following vehicle.

Figure 7B:
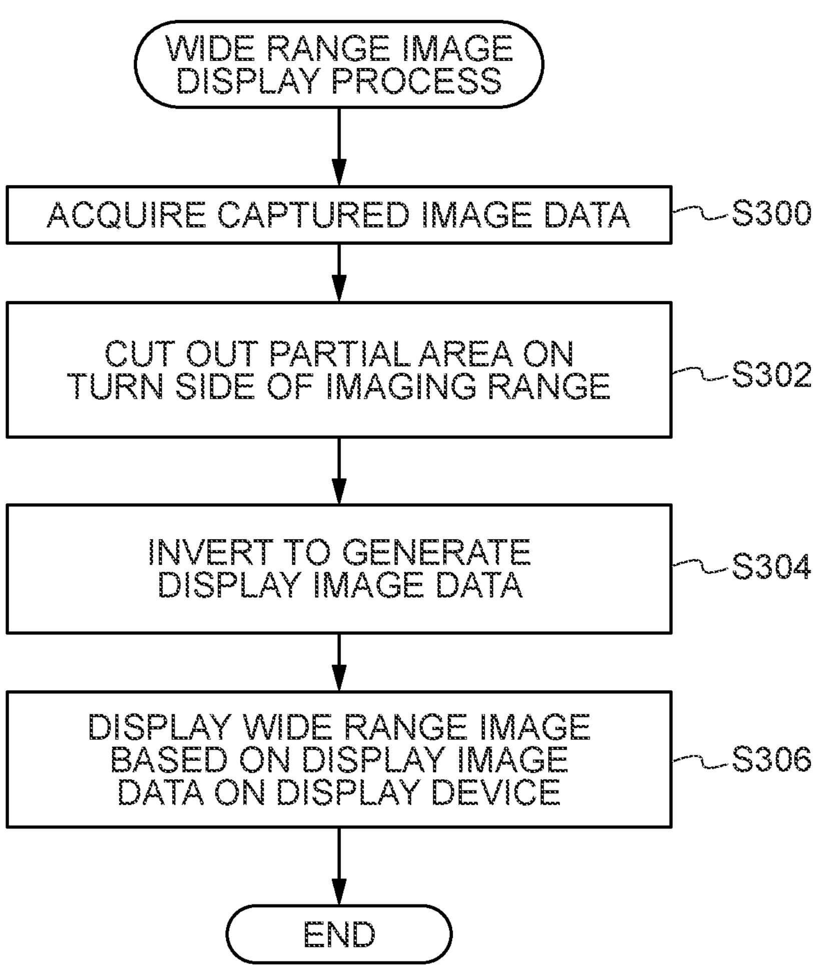
FIG. 7B is a flowchart showing an example of the flow of a wide range image display process.

Here, the flow of the wide range image display process will be described. As shown in FIG. 7B, the display control unit 52 acquires the captured image data from the image capture device 12 (step S300). The display control unit 52 performs image processing on the captured image data so as to cut out a partial area of the imaging range as the display range (step S302). Next, the display control unit 52 performs image processing on the captured image data so as to horizontally invert the image in the display range and thereby generate image data for display to be displayed on the display device 14 (step S304). Next, the display control unit 52 outputs the display image data to the display device 14 and causes the display device 14 to display image based on the display image data (step S306).

In the cutting-out of the display range in step S302, first, the display control unit 52 identifies the blind spot area 68 in the captured image. Next, the display control unit 52 decides the cut-out range so that the lower side of the rectangular area 64 intersects both side ends of the blind spot area 68 and so as to include the vanishing point of the blind spot area 68 (see FIG. 6A). By deciding the cut-out range in this way, the display control unit 52 can include the blind spot area 68 in the area 64.

Returning to FIG. 5, next, in step S110 the switch determination unit 50 determines whether or not an instruction to switch screens has been given during display of the wide range image. When an instruction to switch screens has been given, the process returns to step S100, where the display control unit 52 causes the display device 14 to display the initial screen. When an instruction to switch screens has not been given, the process proceeds to step S112.

Next, in step S112 the CPU 30 determines whether or not to end the display. For example, when an instruction to turn off the display device 14 is given, the CPU 30 makes a YES determination in step S112 and ends the routine. When the display is not to be ended, the CPU 30 makes a NO determination in step S112 and the process returns to step S110, where the switch determination unit 50 repeatedly determines whether or not an instruction to switch screens has been given. Consequently, the processes of step S100 to step S112 are repeatedly executed until the display device 14 is turned off.

Figure 8:
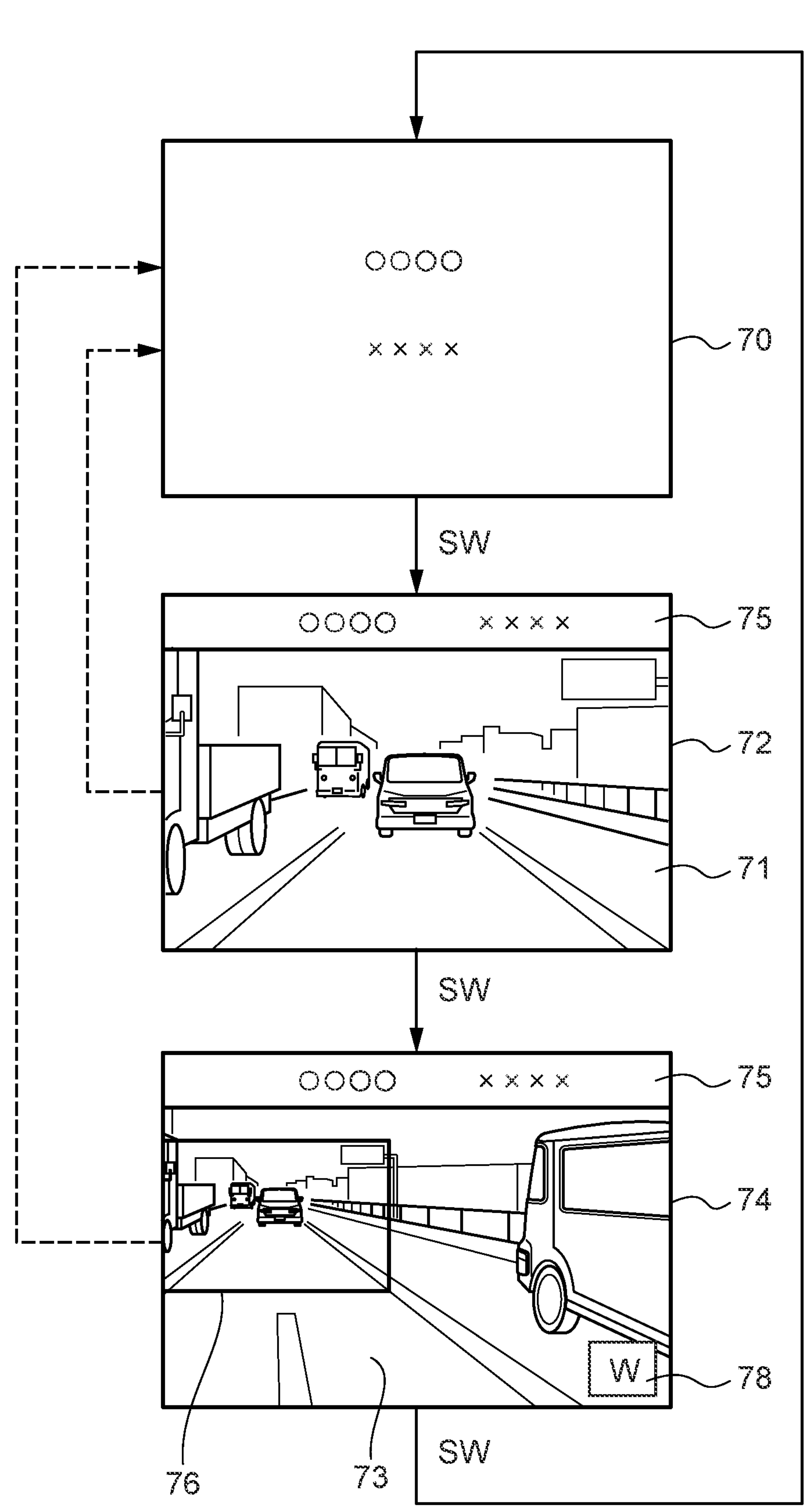
FIG. 8 is a schematic diagram showing screen transitions in response to switch operations.

FIG. 8 is a schematic diagram showing screen transitions in response to switch operations. As indicated by the solid line in FIG. 8, when the display device 14 is turned on, first, an initial screen (i.e., a vehicle information screen) 70 is displayed on the display device 14. When the switch is pushed so that an instruction to switch screens is given during display of the initial screen 70, the display screen transitions from the initial screen 70 to a screen 72 that displays the standard image 71.

When the switch is pushed so that an instruction to switch screens is given during display of the screen 72, the display screen transitions from the screen 72 that displays the standard image 71 to a screen 74 that displays the wide range image 73. When the switch is pushed so that an instruction to switch screens is given during display of the screen 74, the display screen transitions from the screen 74 that displays the wide range image 73 to the initial screen 70.

An image 75 that displays the vehicle information included in the initial screen 70 may be superimposed and displayed on the screen 72 that displays the standard image 71 and the screen 74 that displays the wide range image 73. The image 75 that displays the vehicle information can, for example, be displayed in end portions (e.g., upper end portions or lower end portions) of the screen 72 and the screen 74. Furthermore, a frame 76 indicating the area displayed in the standard image 71 and an icon 78 indicating that the wide range image 73 is currently being displayed may be superimposed and displayed on the screen 74 that displays the wide range image 73.

Furthermore, the push button switch may be configured to be subjected to long pressing (i.e. holding down). In the example described above, the display screen is switched between three screens by operating the switch two times, so that when the switch is pushed during display of the initial screen 70, the display screen transitions to the screen 72 that displays the standard image 71, and when the switch is pushed during display of the screen 72, the display screen transitions to the screen 74 that displays the wide range image 73, but the display screen may be switched between three screens by operating the switch one time by holding down the switch. Continuous operation of the switch can be regarded as an instruction to switch screens.

Furthermore, the dedicated switch may be a switch for giving an instruction to display the wide range image 73. In this case also, when the switch is pushed during display of the initial screen 70, the display screen does not directly transition from the initial screen 70 to the screen 74 that displays the wide range image 73 but transitions to the screen 72 that displays the standard image 71 and thereafter transitions from the screen 72 to the screen 74 that displays the wide range image 73.

As described above, according to the image display system according to the first embodiment, various advantageous effects such as described below can be obtained.

(1) The image capture device captures a wide range of the area behind the vehicle, but the standard image obtained by cutting out the area of the imaging range that the rider wants to see is displayed on the display device disposed in front of the rider while the rider is driving, so the range that the rider wants to see is displayed large, thus improving visibility. Furthermore, the rider becomes able to check the area that is a blind spot directly behind the vehicle, and it becomes easy for the rider to check the area behind the vehicle. Moreover, because it becomes easy for the rider to check the area behind the vehicle, looking-back movement (head checks) by the rider can be reduced, and an improvement in safety is expected.

(2) The wide range image is displayed in response to an instruction from the rider. This makes it easy for the rider to grasp the situation around the host vehicle. Furthermore, the wide range image is not suddenly displayed; rather, the standard image is displayed at the same magnification as that of the optical mirrors and then the wide range image is displayed after that, so the rider can look at the wide range image while maintaining a sense of the distance to the following vehicle and a sense of the size of the following vehicle.

(3) Furthermore, because a wide range rear view image on the turn side is displayed, the following advantageous effects are obtained.

(i) The rider can look at a rear view image of the area behind the vehicle on the turn side that the rider wants to check, such as a rear view image of the adjacent lane, when changing course or making a right or left turn.

(ii) Compared with a case where the entire imaging range is displayed, the rear view image on the turn side is displayed in a large size, so the visibility of the image is improved.

(iii) There is less of a change in magnification from the standard image to the wide range image than there is in a case where the entire imaging range is displayed, so it becomes easy for the rider to maintain a sense of the distance to the following vehicle and a sense of the size of the following vehicle.

Furthermore, the blind spot area directly behind the rider is invariably included in the cut-out range in each of the standard image and the wide range image in which the turn side is wide, so the blind spot directly behind the rider that does not appear in the optical mirrors can be reduced.

Second Embodiment

In the first embodiment, the screen is sequentially switched by operating the switch, but in a second embodiment, a time limit is placed on the display of the rear view image, and when a subsequent operation of the switch is not performed within a predetermined amount of time, the display screen returns to the initial screen.

In the second embodiment, the flow of processes in the image display program is different from that of the first embodiment. For this reason, description of parts that are the same as those of the first embodiment will be omitted, and just differences will be described.

(Image Display Program)

Next, the image display program will be described.

Figure 9:
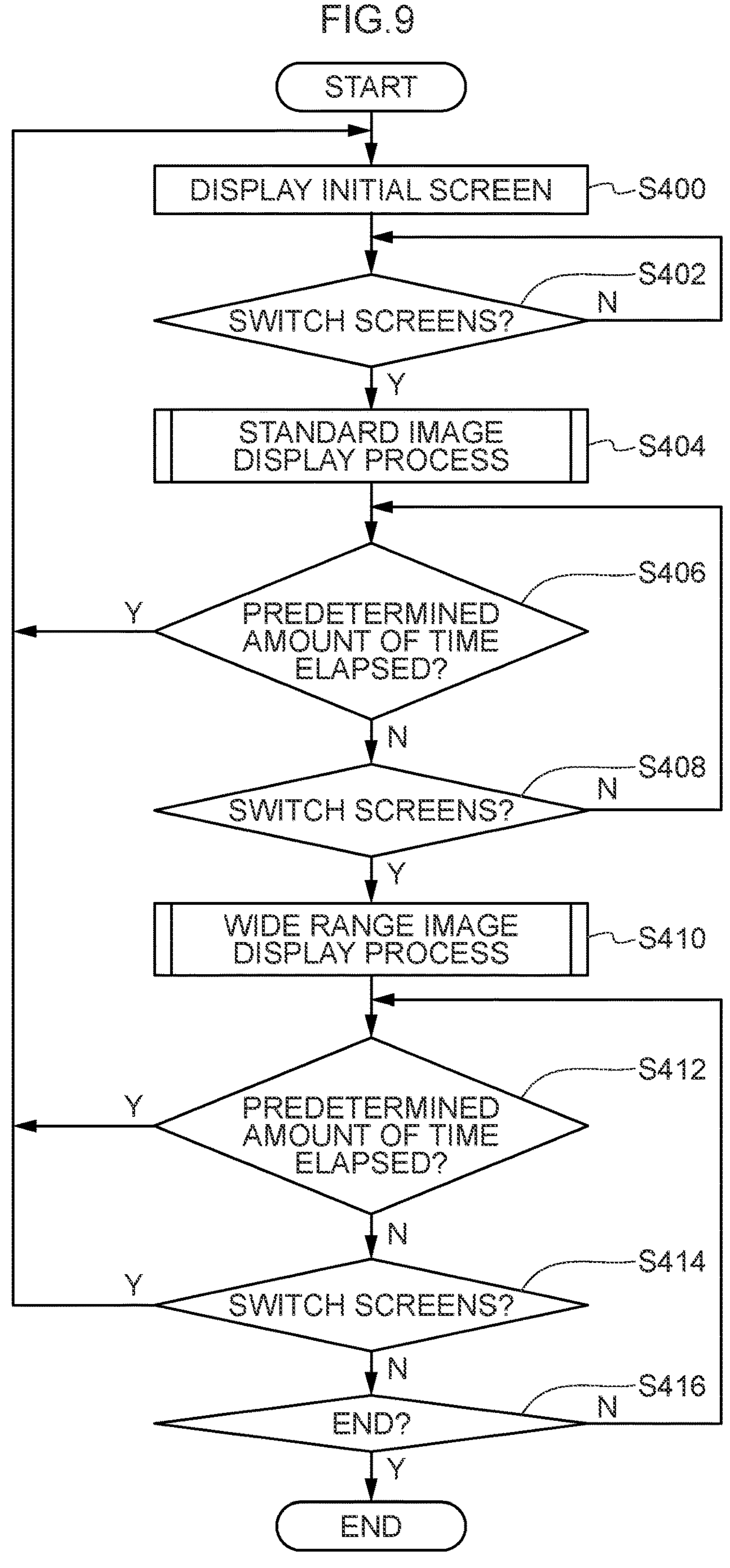
FIG. 9 is a flowchart showing an example of the flow of processes in an image display program according to a second embodiment of the disclosure.

FIG. 9 is a flowchart showing an example of the flow of processes in the image display program according to the second embodiment. The image display program is executed by the CPU 30 of the control device 16 and is started when the display device 14 is turned on. Here, excluding step S416, the operations of the CPU 30 will be described as operations of the functional units shown in FIG. 4.

First, in step S400 the display control unit 52 causes the display device 14 to display the initial screen. Next, in step S402 the switch determination unit 50 determines whether or not an instruction to switch screens has been given during display of the initial screen. When an instruction to switch screens has been given, the process proceeds to step S404. When an instruction to switch screens has not been given, the process returns to step S402 and the switch determination unit 50 repeatedly determines whether or not an instruction to switch screens has been given until an instruction is given.

Next, in step S404 the display control unit 52 executes the standard image display process that switches the display screen to a screen that displays the standard image. Next, in step S406 the switch determination unit 50 determines whether a predetermined amount of time has elapsed since switching to the screen that displays the standard image. When the predetermined amount of time has elapsed, the process returns to step S400, where the display control unit 52 causes the display device 14 to display the initial screen. When the predetermined amount of time has not elapsed, the process proceeds to step S408.

Next, in step S408 the switch determination unit 50 determines whether or not an instruction to switch screens has been given during display of the standard image. When an instruction to switch screens has been given, the process proceeds to step S410. When an instruction to switch screens has not been given, the process returns to step S406.

Next, in step S410 the display control unit 52 executes the wide range image display process that switches the display screen to a screen that displays the wide range image in which the turn side is wide. Next, in step S412 the switch determination unit 50 determines whether a predetermined amount of time has elapsed since switching to the screen that displays the wide range image. When the predetermined amount of time has elapsed, the process returns to step S400, where the display control unit 52 causes the display device 14 to display the initial screen. When the predetermined amount of time has not elapsed, the process proceeds to step S414.

Next, in step S414 the switch determination unit 50 determines whether or not an instruction to switch screens has been given during display of the wide range image. When an instruction to switch screens has been given, the process returns to step S400, where the display control unit 52 causes the display device 14 to display the initial screen. When an instruction to switch screens has not been given, the process proceeds to step S416.

Next, in step S416 the CPU 30 determines whether or not to end the display. When the display is to be ended, the CPU 30 makes a YES determination in step S416 and ends the routine. When the display is not to be ended, the CPU 30 makes a NO determination in step S416 and the process returns to step S412. Consequently, the processes of step S400 to step S416 are repeatedly executed until the display device 14 is turned off.

As indicated by the solid line in FIG. 8, when the display device 14 is turned on, first, the initial screen 70 is displayed on the display device 14. When the switch is pushed so that an instruction to switch screens is given during display of the initial screen 70, the display screen transitions from the initial screen 70 to the screen 72 that displays the standard image 71.

When the switch is pushed so that an instruction to switch screens is given within the predetermined amount of time since display of the screen 72 was started, the display screen transitions from the screen 72 that displays the standard image 71 to the screen 74 that displays the wide range image 73 as indicated by the solid line in FIG. 8. When the predetermined amount of time elapses without the switch being pushed, the display screen transitions from the screen 72 that displays the standard image 71 to the initial screen 70 as indicated by the dashed line in FIG. 8.

Furthermore, when the switch is pushed so that an instruction to switch screens is given within the predetermined amount of time since display of the screen 74 was started, the display screen transitions from the screen 74 that displays the wide range image 73 to the initial screen 70 as indicated by the solid line in FIG. 8. Also when the predetermined amount of time elapses without the switch being pushed, the display screen transitions from the screen 74 that displays the wide range image 73 to the initial screen 70 as indicated by the dashed line in FIG. 8.

As described above, according to the image display system according to the second embodiment, in addition to the same advantageous effects as those of the first embodiment being obtained, annoyance when the rider is looking forward can be reduced. That is, the rider may sometimes feel annoyance if the rear image is always displayed on the display device disposed in front of the rider, but by placing a time limit on the display of the rear image, such annoyance can be reduced.

Third Embodiment

In the first embodiment, the screen is sequentially switched by operating a dedicated switch, but in a third embodiment, the screen is switched in conjunction with the operation of a turn switch. Furthermore, in the third embodiment, another example of the cut-out range corresponding to the wide range image is described.

In the third embodiment, the switch for switching screens, the display range of the wide range image, and the flow of processes (particularly the sub-routine of the wide range image display process) in the image display program are different from those of the first embodiment. For this reason, description of parts that are the same as those of the first embodiment will be omitted, and just differences will be described.

Figure 10:
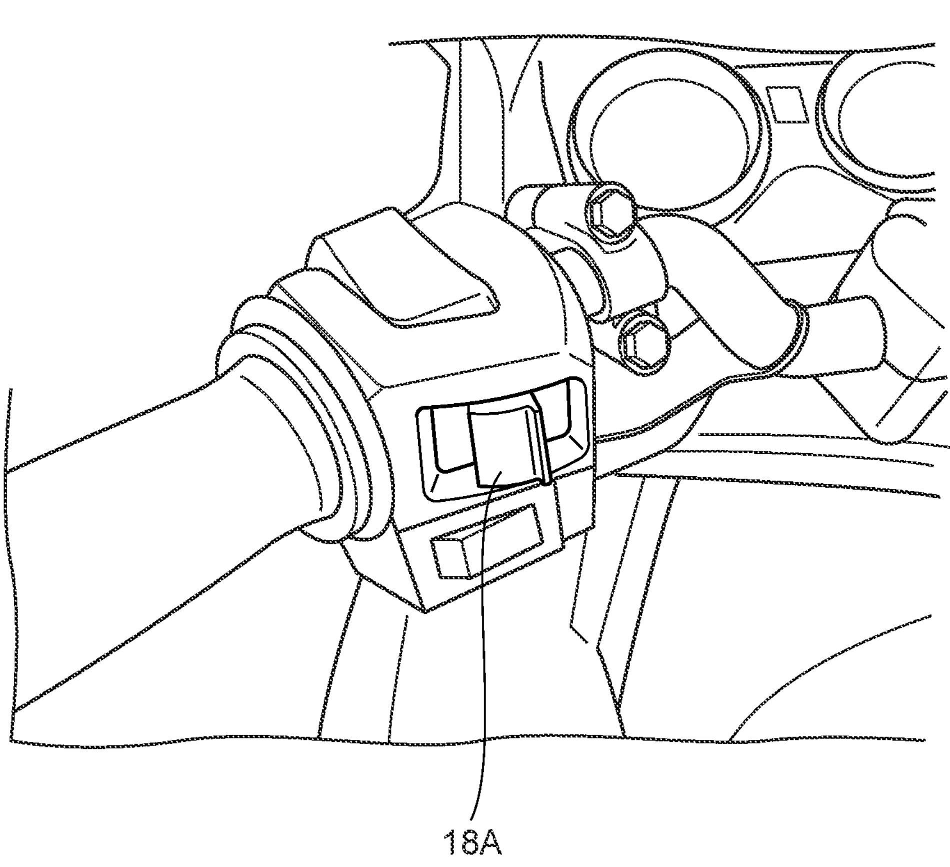
FIG. 10 is a schematic view showing another example of an operation device.

In the third embodiment, a turn switch 18A is an example of the operation device 18. The vehicle body 11 of the motorcycle is provided with the turn switch 18A as shown in FIG. 10. The turn switch may, for example, be a slide switch that moves left and right, with the switch being configured to return to a center position when the rider releases his/her finger from it. When changing course, the rider slides the slide switch left or right to activate the turn signal on the turn side. In the third embodiment, when the turn switch 18A is operated, the screen is switched in conjunction with that operation.

(Image Display Program)

Next, the image display program will be described.

Figure 11:
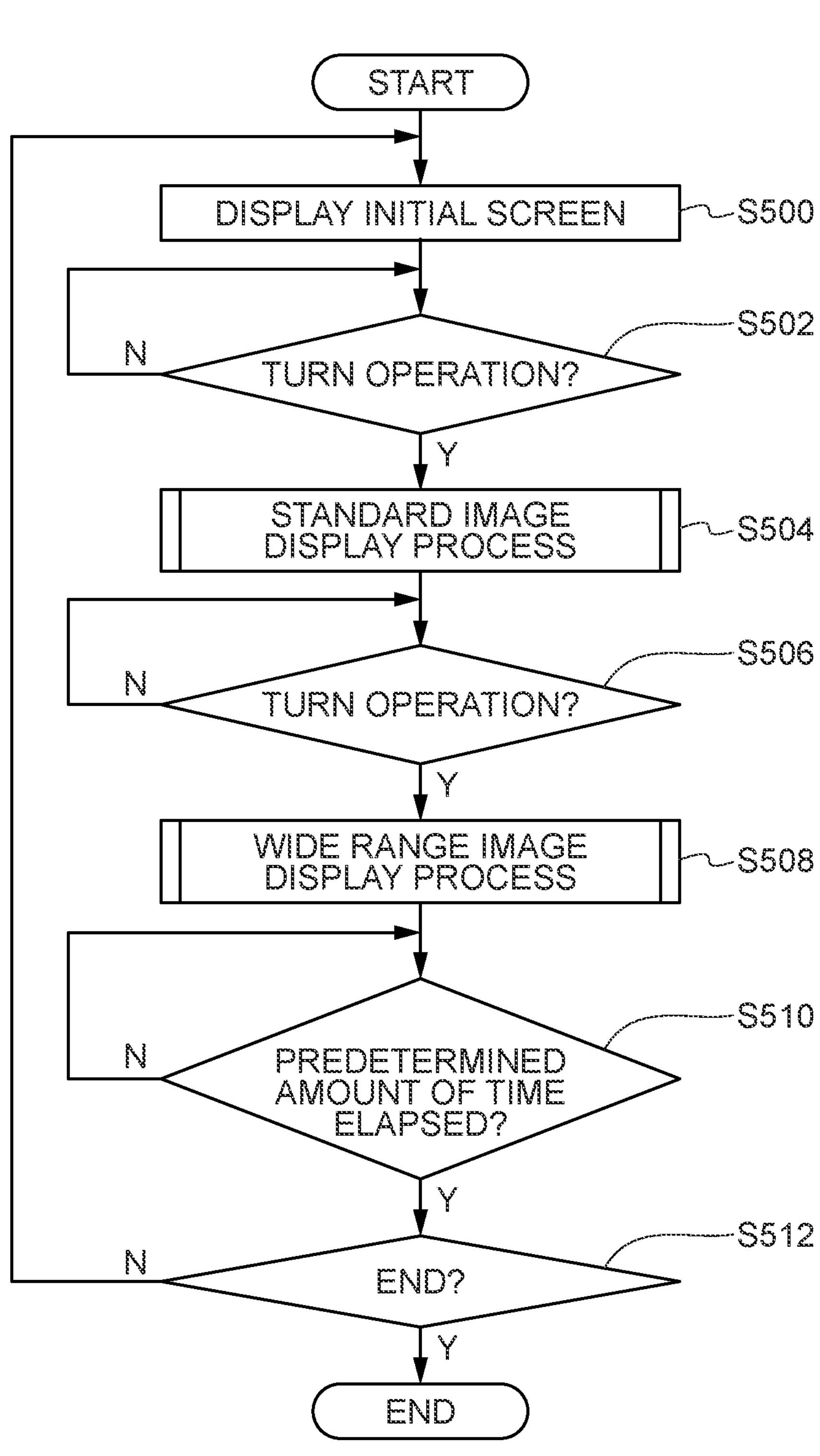
FIG. 11 is a flowchart showing an example of the flow of processes in an image display program according to a third embodiment of the disclosure.

FIG. 11 is a flowchart showing an example of the flow of processes in the image display program according to the third embodiment. The image display program is executed by the CPU 30 of the control device 16 and is started when the display device 14 is turned on.

The flow of processes is generally the same as that of the image display program shown in FIG. 5, and steps S500 to S512 of FIG. 11 correspond to steps S100 to S112 of FIG. 5. However, the content of the wide range image display process of step S508 is different from that of step S108 of FIG. 5, and the processes of step S510 and step S512 are also different from those of step S110 and step S112 of FIG. 5.

First, in step S500 the display control unit 52 causes the display device 14 to display the initial screen. Next, in step S502 the switch determination unit 50 determines whether or not the turn switch has been operated during display of the initial screen. When the turn switch has been operated, the process proceeds to step S504. When the turn switch has not been operated, the process returns to step S502 and the switch determination unit 50 repeatedly determines whether or not the turn switch has been operated.

Next, in step S504 the display control unit 52 executes the standard image display process that switches the display screen to a screen that displays the standard image. Next, in step S506 the switch determination unit 50 determines whether or not the turn switch has been operated during display of the standard image. When the turn switch has been operated, the process proceeds to step S508. When the turn switch has not been operated, the process returns to step S506 and the switch determination unit 50 repeatedly determines whether or not the turn switch has been operated.

Figure 12A:
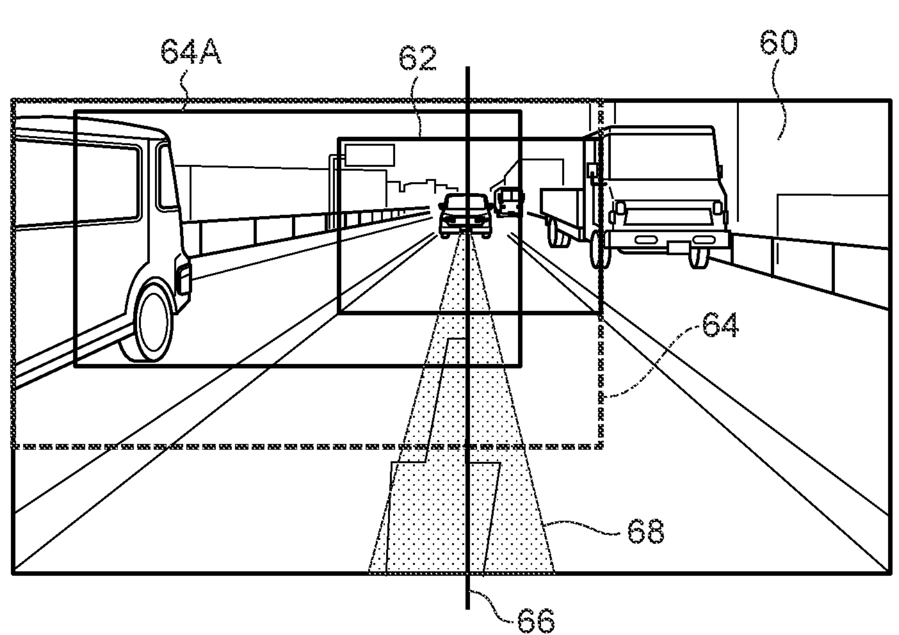
FIG. 12A is a schematic diagram showing the standard image and the wide range image.
Figure 12B:
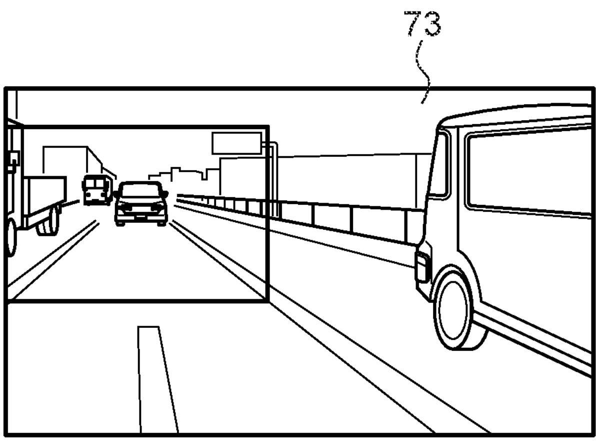
FIG. 12B is a schematic diagram showing the wide range image.
Figure 12C:
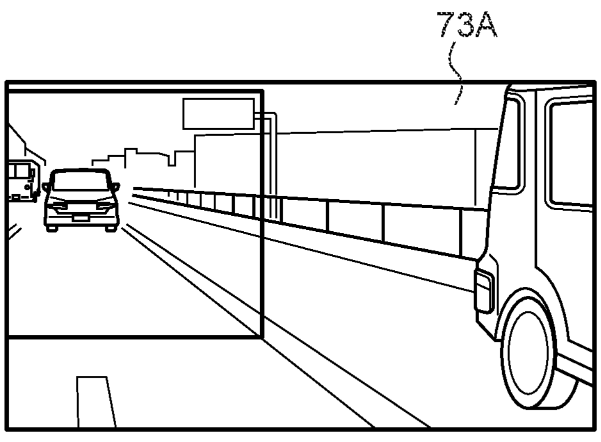
FIG. 12C is a schematic diagram showing the wide range image.

Next, in step S508 the display control unit 52 executes the wide range image display process that switches the display screen to a screen that displays the wide range image in which the turn side is wide. Here, another example of the cut-out range will be described. A wide range image 73A in which the turn side is wide shown in FIG. 12C is an image obtained by cutting out and inverting an area 64A so that the turn side of the imaging range of the captured image 60 is wide as shown in FIG. 12A.

In the first embodiment, the area 64 is cut out as the wide range image 73 (see FIG. 12B) so as to include the entire area 62 corresponding to the standard image 71, but in the third embodiment, the area 64A includes the blind spot area 68 but only partially includes the area 62. By cutting out the area 64A so as to not include part of the area 62, the cut-out range can be reduced, and the magnification of the wide range image 73A shown in FIG. 12C can be increased over the magnification of the wide range image 73 shown in FIG. 12B.

Returning to the description of FIG. 11, next, in step S510 the switch determination unit 50 determines whether a predetermined amount of time has elapsed since switching to the screen that displays the wide range image. When the predetermined amount of time has elapsed, the process proceeds to step S512. When the predetermined amount of time has not elapsed, the process returns to step S510 and the switch determination unit 50 repeatedly makes the determination until the predetermined amount of time elapses. Next, in step S512, the CPU 30 determines whether or not to end the display. When the display is to be ended, the CPU 30 makes a YES determination in step S512 and ends the routine. When the display is not to be ended, the CPU 30 makes a NO determination in step S512 and the process returns to step S500, where the display control unit 52 causes the display device 14 to display the initial screen.

The screen transitions will now be described with reference to the screen transition diagram of FIG. 8, except that the wide range image 73 will be replaced with the wide range image 73A (see FIG. 12C). As indicated by the solid line in FIG. 8, when the display device 14 is turned on, first, the initial screen 70 is displayed on the display device 14. When the turn switch is operated during display of the initial screen 70, the display screen transitions from the initial screen 70 to the screen 72 that displays the standard image 71. Next, when the turn switch is operated during display of the screen 72, the display screen transitions from the screen 72 that displays the standard image 71 to the screen 74 that displays the wide range image 73A.

In the third embodiment, the screen is switched in conjunction with the operation of the turn switch, but because the turn switch is a switch for activating the turn signals, the display screen is switched to the screen 74 that displays the wide range image 73A in which the turn side is wide and thereafter the display screen returns to the initial screen 70 when a predetermined amount of time elapses as indicated by the dashed line in FIG. 8 without requiring an operation of the switch.

As described above, according to the image display system according to the third embodiment, in addition to the same advantageous effects as those of the first embodiment being obtained, there can be obtained the advantageous effect that the screen is automatically switched in response to situations such as changing course and making a right or left turn, so the number of times that the rider performs switch operations can be reduced. Furthermore, compared with a case where the wide range image includes the entire area corresponding to the standard image, a wide range image with a large magnification can be displayed, thus improving visibility.

Furthermore, the turn switch may also be configured to be subjected to long pressing (i.e. holding down) by, for example, holding it down with one's finger so that the switch does not return to the center position. Consequently, the display screen may be configured to transition from the initial screen 70 to the screen 72 that displays the standard image 71 and transition from the screen 72 to the screen 74 that displays the wide range image 73A by operating the switch one time by holding down the switch. Continuous operation of the switch can be regarded as an instruction to switch screens.

Furthermore, when the turn switch is operated, the rider presumably wants to see the wide range image in which the turn side is wide, so the display screen may be configured to transition from the initial screen 70 to the screen 72 that displays the standard image 71 and automatically transition from the screen 72 to the screen 74 that displays the wide range image 73A even without the rider holding down the switch.

Furthermore, the turn switch 18A may be used in combination with the operation device 18 (i.e., the dedicated switch). For example, the switch from the initial screen 70 to the screen 72 that displays the standard image 71 may be performed by the dedicated switch, and the switch from the screen 72 that displays the standard image 71 to the screen 74 that displays the wide range image 73A may be performed by the turn switch 18A.

Fourth Embodiment

In the first embodiment, an example was described where the image display system displays two types of image, the standard image and the wide range image in which the turn side is wide, but in a fourth embodiment, the image display system is configured to gradually (i.e., in stages or continuously) expand the area cut out from the imaging range.

Figure 13A:
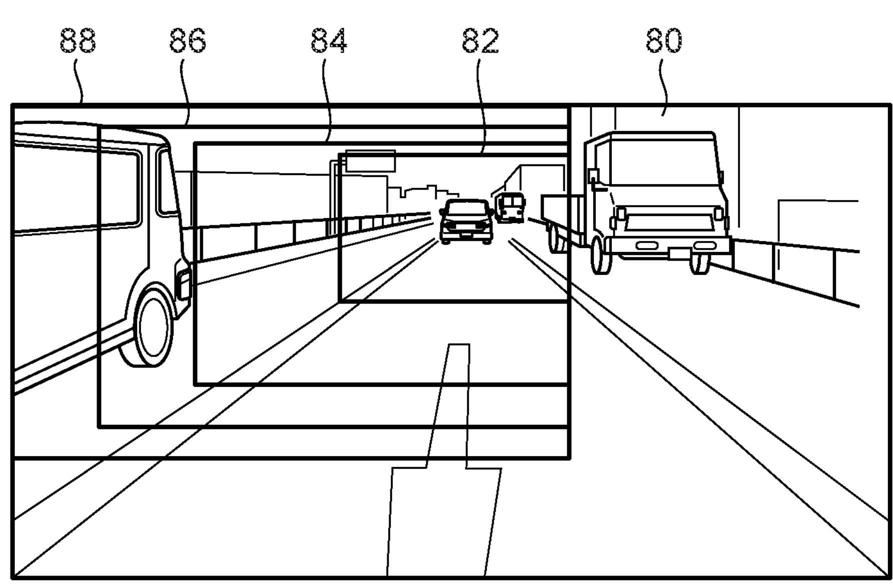
FIG. 13A is a schematic diagram showing image being switched in stages.
Figure 13B:
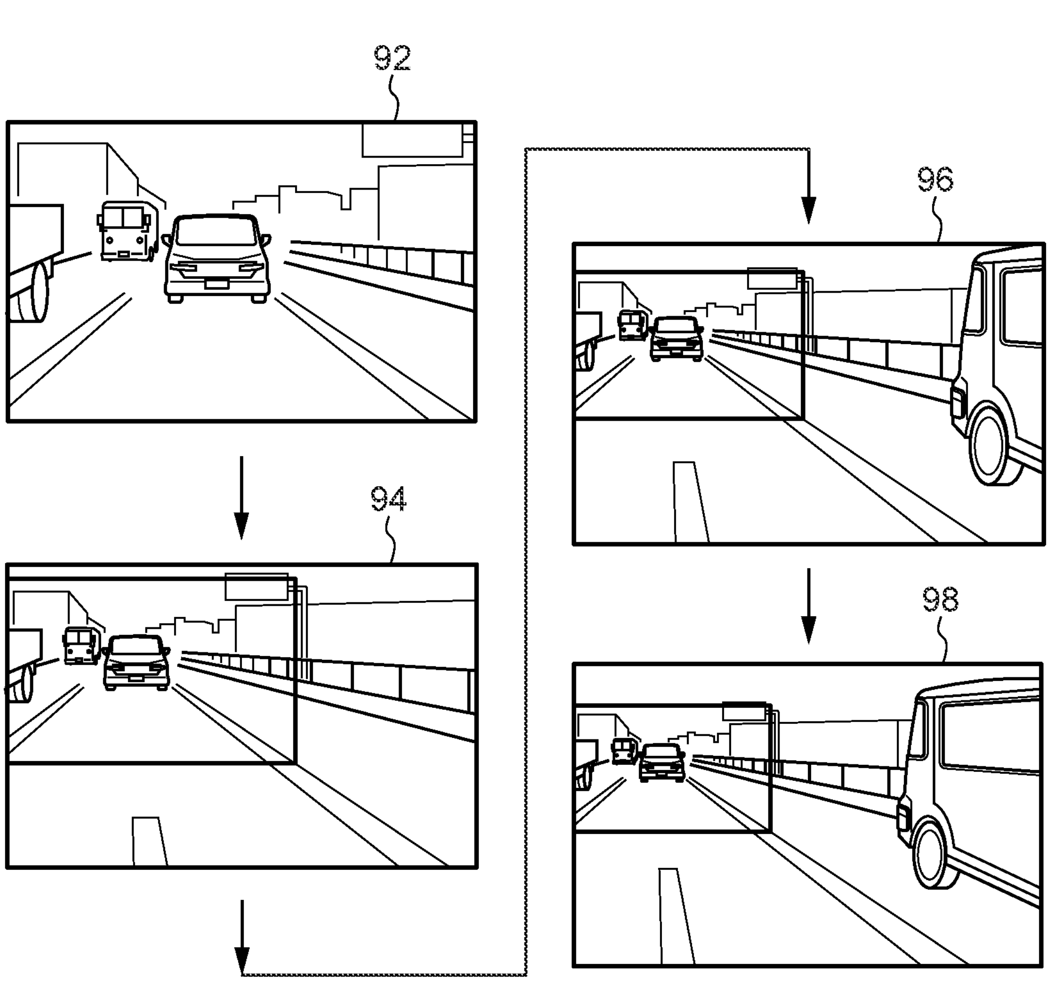
FIG. 13B is a schematic diagram showing image being switched in stages.

For example, as shown in FIG. 13A, the image display system enlarges in stages, in the order of an area 82, an area 84, an area 86, and an area 88, the area cut out from a captured image 80. In accompaniment with this, as shown in FIG. 13B, the magnification of the image displayed on the display device 14 becomes smaller in stages in the order of an image 92, an image 94, an image 96, and an image 98. By sequentially displaying these images, the magnification of the image displayed on the display device 14 appears to continuously change as when a camera zooms out.

According to the image display system according to the fourth embodiment, in addition to the same advantageous effects as those of the first embodiment being obtained, it becomes easy for the rider to perceive changes in the image, and it becomes easy to maintain a sense of the distance to the following vehicle and a sense of the size of the following vehicle.

Fifth Embodiment

In the first to fourth embodiments, an example was described where the area corresponding to the standard image and the area corresponding to the wide range image are cut out in similar shapes, but in a fifth embodiment, the image display system changes the shape of each of the areas cut out from the imaging range.

Figure 14A:
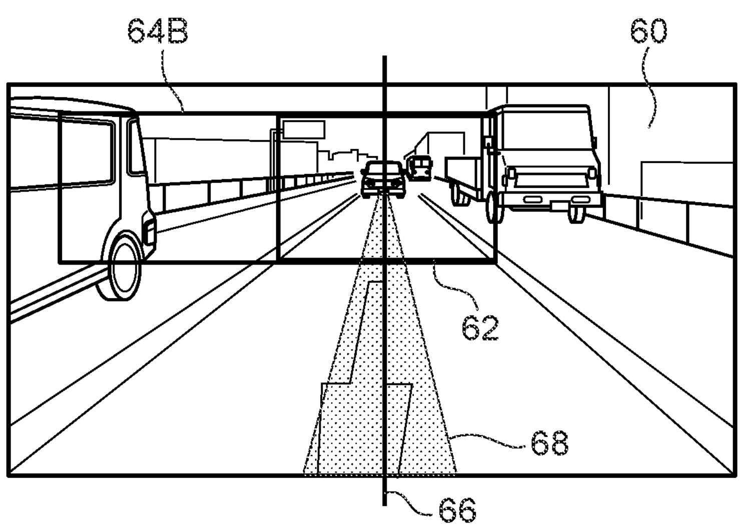
FIG. 14A is a schematic diagram showing a variation in the cut-out range of the wide range image.
Figure 14B:
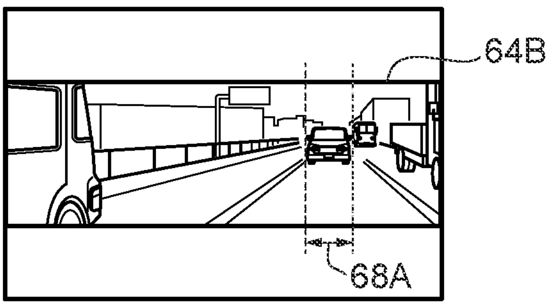
FIG. 14B is a schematic diagram showing a variation in the cut-out range of the wide range image.

For example, as shown in FIG. 14A, when cutting out an area 64B so that the turn side of the imaging range of the captured image 60 is wide in the wide range image display process, the image display system cuts out the area 64B so as to include the area 62 corresponding to the standard image 71 (see FIG. 6C) and an area obtained by sliding the area 62 in the left and right direction. In this case also, each of the area 62 and the area 64B includes the blind spot area 68. However, as shown in FIG. 14B, because the size of the display unit 40 of the display device 14 is fixed, the magnification ends up becoming smaller if the cut-out area 64B is displayed as is as the wide range image.

Figure 14C:
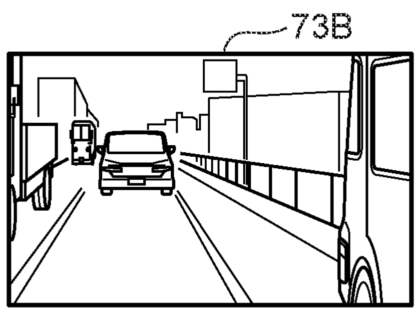
FIG. 14C is a schematic diagram showing a variation in the cut-out range of the wide range image.

In the fifth embodiment, as shown in FIG. 14C, the image display system displays the cut-out area 64B so that an area 68A corresponding to the maximum width of the blind spot area 68 is displayed at the same magnification as that of the standard image but compresses in the left and right direction and displays areas other than the area 68A, so that the standard image and the wide range image in which the turn side is wide have similar shapes. As a result, a wide range image 73B is displayed. For example, in step S304 of FIG. 7B, the display control unit 52 performs image processing on the captured image data so as to partially compress the image of the cut-out display range and horizontally invert the image to thereby generate display image data. Then, the display control unit 52 displays the wide range image 73B based on the generated display image data.

According to the image display system according to the fifth embodiment, in addition to the same advantageous effects as those of the first embodiment being obtained, the wide range image in which the turn side is wide can be displayed while the blind spot area directly behind the rider is displayed as is at the same magnification as the standard image.

It will be noted that although in the above example the area displayed at the same magnification as that of the standard image is limited to the area 68A, for example, the change in the magnification of the part including the area 62 may be decreased and the compression ratio of the other part may be increased. Furthermore, although in the above example the display control unit 52 compresses in the left and right direction the areas other than the area 68A, the display control unit 52 may also compress in the up and down direction the areas other than the area 68A. Furthermore, the display control unit 52 may be configured to superimpose and display a compression boundary line so that the rider may understand the division between the compressed area and the non-compressed areas.

Sixth Embodiment

In the first to fifth embodiments, the standard image corresponds to “a first image corresponding to a first area” of the disclosure and the wide range image in which the turn side is wide corresponds to “a second image corresponding to a second area” of the disclosure, but in a sixth embodiment, it does not matter if the first area and the second area are wide or narrow.

Figure 14D:
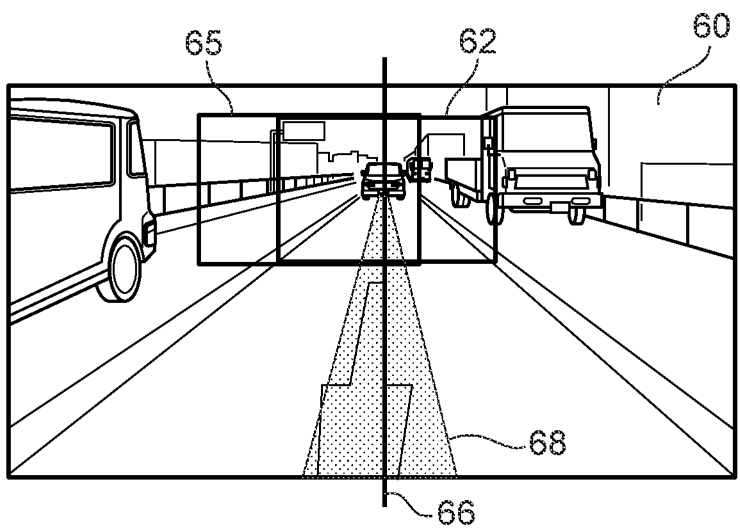
FIG. 14D is a schematic diagram showing a variation in the cut-out range of the wide range image.

For example, as shown in FIG. 14D, the present disclosure can also be applied to a case where the image display system displays the standard image corresponding to the area 62, and thereafter slides in the left and right direction the area 62 corresponding to the standard image, cuts out an area 65 that has the same size as the area 62, displays a slide image corresponding to the area 65. Furthermore, the present disclosure can also be applied to a case where the image display system displays an image of the entire imaging range and thereafter displays a slide image corresponding to the area 65.

The area 65 corresponding to the second area has the same size as the area 62 corresponding to the first area, so although the slide image cannot be said to be a wide range image, the blind spot can be reduced by cutting out the area 65 so as to include the blind spot area 68.

Seventh Embodiment

In the first to sixth embodiments, the image display system decides the blind spot area in accordance with the vehicle width, but in a seventh embodiment, the rider sets the blind spot area. This setting can be performed while the vehicle is stopped.

Figure 15A:
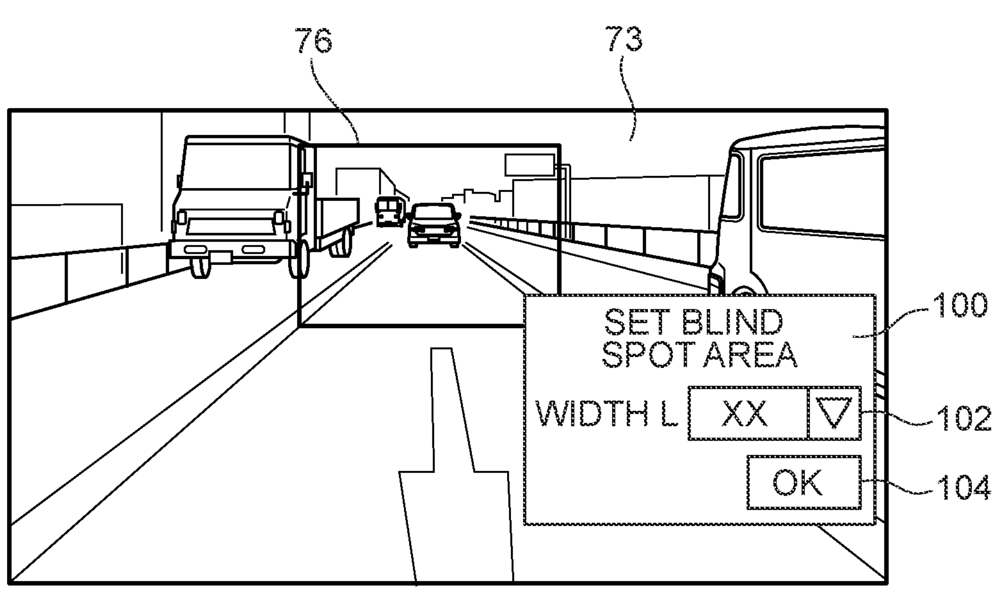
FIG. 15A is a schematic diagram describing an example of a method of receiving a blind spot area setting.

As shown in FIG. 15A, the image display system displays an image of the entire imaging range as a wide range image on the display device 14, also displays a screen 100 for setting the blind spot area as a pop-up on the image 73, and receives a setting from the rider. Like the area 68 determined by the vehicle width shown in FIG. 6A, the blind spot area is an isosceles triangle whose apex is a vanishing point and which is symmetrical relative to the vehicle centerline 66 (see FIG. 14A). In this case, the blind spot area 68 can be set by setting a width L that is the base of the isosceles triangle.

Figure 15B:
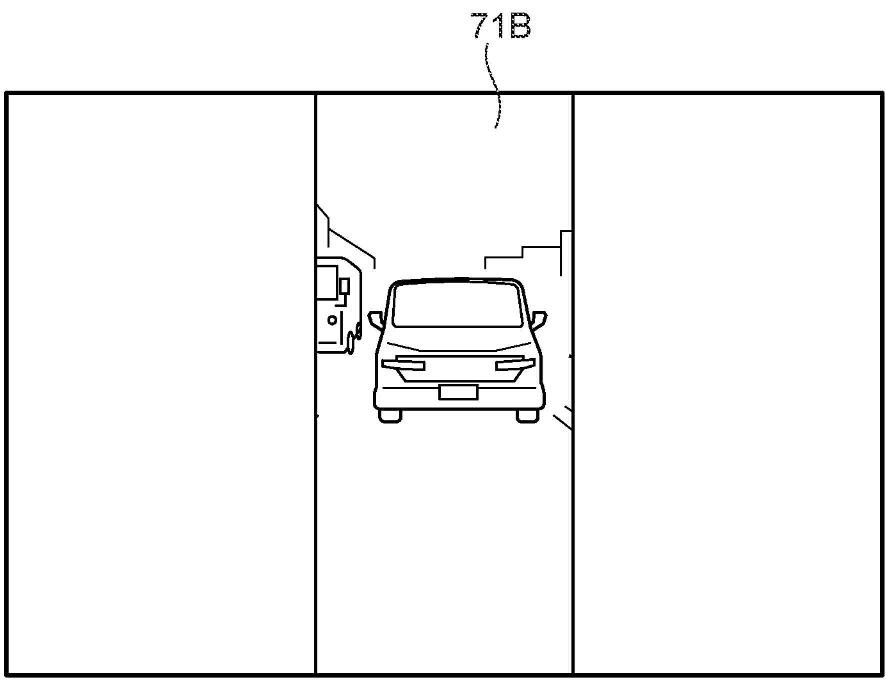
FIG. 15B is a schematic diagram describing an example of a method of receiving a blind spot area setting.

For example, the screen 100 includes an input field 102 for inputting the value of the width L and an OK button 104. When the rider inputs the value of the width L in the input field 102 and pushes the OK button 104, an image 71B corresponding to the blind spot area 68 that has been set within the standard image 71 indicated by the frame 76 in FIG. 15A is enlarged and displayed as shown in FIG. 15B for example. The rider adjusts the value of the width L while comparing the image 71B displayed on the display device 14 and the range appearing in the rearview optical mirrors and sets the range that cannot be seen in the optical mirrors as the blind spot area 68.

The blind spot area changes in accordance with the build of the rider and the installation conditions of the optical mirrors. By setting as the blind spot area 68 the range that the rider cannot actually see, the blind spot can be reliably reduced regardless of the build of the rider and the installation conditions of the optical mirrors.

It will be noted that the setting method is an example and may be configured so that when the rider inputs his/her height and weight, the image display system calculates the blind spot area 68 predicted from the values input by the rider, displays the corresponding image 71B, and receives corrections. Alternatively, the setting method may be configured so that when the rider sits down, the image display system automatically measures the position of the rider's eyes and the rider's body width to calculate the blind spot area 68.

Furthermore, the setting method may be configured so that in an initial setting the image display system decides the blind spot area in accordance with the vehicle width and thereafter the rider can change the setting.

Eighth Embodiment

In the first embodiment, the screen is sequentially switched by operating a dedicated switch, but in an eighth embodiment, the screen is switched when it has been determined that the vehicle is in a stopped state based on the vehicle information. For example, when the vehicle is driving among multiple vehicles in a motorcycle tour, sometimes the rider may want to check on the situation of another vehicle positioned directly behind the rider when the rider's vehicle is in a stopped state, such as when waiting at a traffic light. According to the eighth embodiment, such needs can be met.

(Image Display Program)

Figure 16:
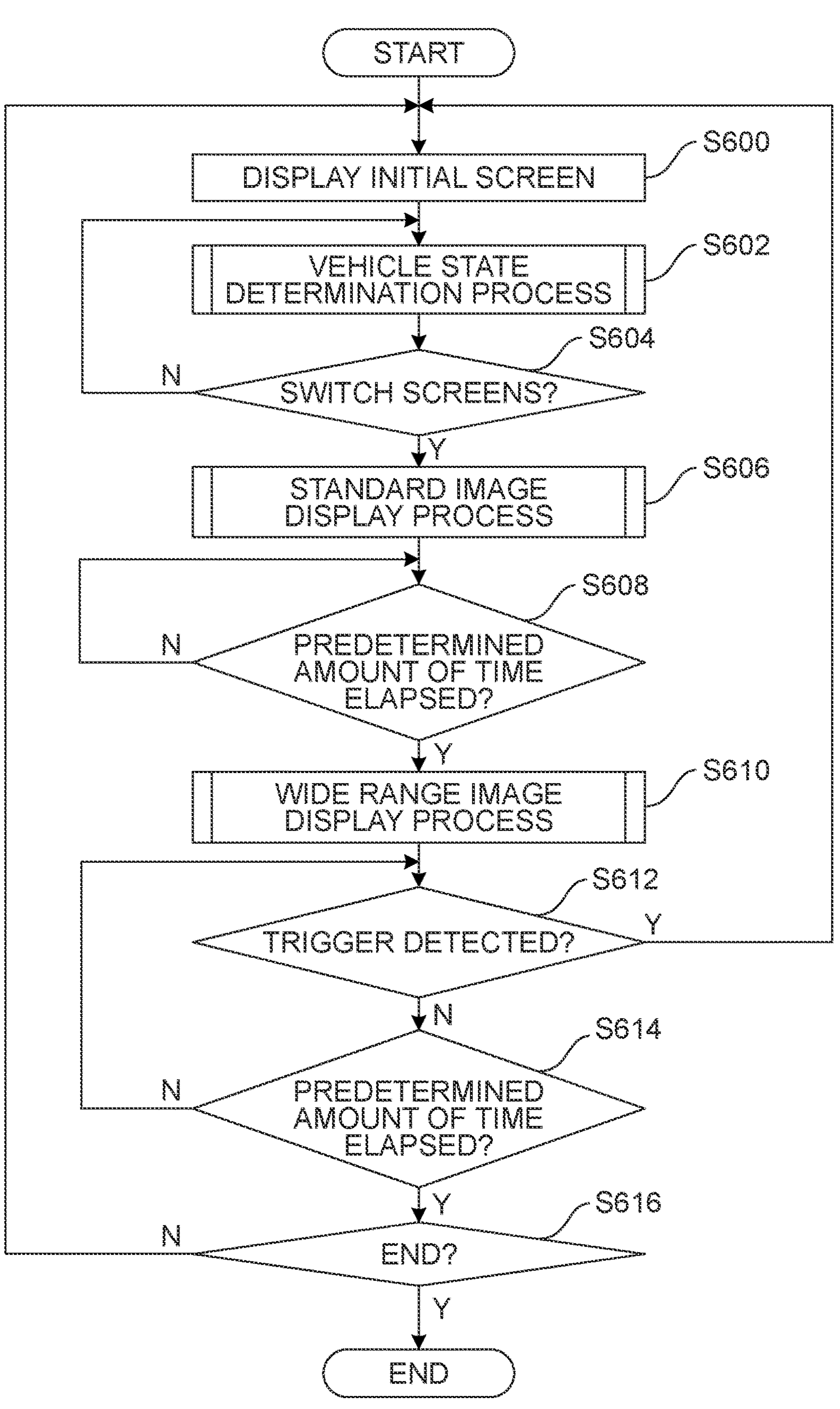
FIG. 16 is a flowchart showing an example of the flow of processes in an image display program according to an eighth embodiment of the disclosure.

In the eighth embodiment, the flow of processes in the image display program is different from that of the first embodiment. For this reason, description of parts that are the same as those of the first embodiment will be omitted, and just differences will be described. FIG. 16 is a flowchart showing an example of the flow of processes in the image display program according to the eighth embodiment. The image display program is executed by the CPU 30 of the control device 16 and is started when the display device 14 is turned on. Here, excluding step S616, the operations of the CPU 30 will be described as operations of the functional units shown in FIG. 4.

First, in step S600 the display control unit 52 causes the display device 14 to display the initial screen. Next, in step S602 the display control unit 52 executes a vehicle state determination process in which it determines whether or not the vehicle is in a predetermined vehicle state based on the vehicle information. In the eighth embodiment, the display control unit 52 determines whether or not the vehicle is in a stopped state. The "stopped state" here is a state in which the vehicle has stopped with the engine left on. For example, there are both cases where the rider is still gripping the clutch lever and cases where the rider has released the clutch level after placing the gear in neutral.

It will be assumed that the vehicle has, as the sensors 20 in FIG. 3, various sensors for acquiring vehicle information. Examples of the sensors include a vehicle speed sensor that detects the vehicle speed, a gear position sensor that detects the gear position, which changes upon operation of a shift pedal, and a clutch switch that detects the engagement or disengagement of the clutch resulting from operation of the clutch lever.

In the vehicle state determination process, the display control unit 52 acquires the vehicle information from the various sensors and determines whether or not the vehicle is in a stopped state based on the vehicle information it has acquired. For example, when the vehicle speed is 0 km/hour and the gear is in neutral for a certain time, or when the vehicle speed is 0 km/hour and the clutch is engaged for a certain time, it can be determined from the detection results of the sensors that the vehicle is in a stopped state. In other cases, it can be determined that the vehicle is not in a stopped state. It will be noted that these criteria are examples, and the display control unit 52 may determine that the vehicle is in a stopped state when, for example, the vehicle speed is 0 km/hour.

Next, in step S604 the switch determination unit 50 determines whether or not to switch screens. When the vehicle is in a stopped state, the switch determination unit 50 determines to switch screens and the process proceeds to step S606. When the vehicle is not in a stopped state, the switch determination unit 50 determines to not switch screens and the process returns to step S602. The display control unit 52 and the switch determination unit 50 repeatedly execute step S602 and step S604 until a determination is made to switch screens.

Next, in step S606 the display control unit 52 executes the standard image display process that switches the display screen to a screen that displays the standard image. Next, in step S608 the display control unit 52 determines whether or not a predetermined amount of time has elapsed since switching to the screen that displays the standard image. When the predetermined amount of time has elapsed, the process proceeds to step S610.

Next, in step S610 the display control unit 52 executes the wide range image display process that switches the display screen to a screen that displays the wide range image. When the vehicle is stopped, the rider presumably wants to see the wide range image of the area behind the rider, so the display screen transitions from the initial screen to a screen that displays the standard image and automatically transitions from that screen to a screen that displays the wide range image. The wide range image here is not limited to image of the turn side.

Next, in step S612 the switch determination unit 50 determines whether or not it has detected a trigger to switch screens. When the vehicle is in a stopped state, the vehicle starting to drive again becomes a trigger to switch screens. For example, when the vehicle speed is 0 km/hour, the gear has been switched from neutral to low, and the clutch is engaged, it can be judged from the detection results of the sensors that the vehicle has started driving. When the switch determination unit 50 detects that the vehicle has started driving as the trigger, the process returns to step S600. Namely, the display control unit 52 causes the display screen to transition from the screen that displays the wide range image to the initial screen.

When the switch determination unit 50 does not detect the trigger in step S612, the process proceeds to step S614. Next, in step S614 the switch determination unit 50 determines whether or not a predetermined amount of time has elapsed since switching to the screen that displays the wide range image. When the predetermined amount of time has not elapsed, the process returns to step S612. When the predetermined amount of time has elapsed without detecting the trigger, the process proceeds to step S616.

Next, in step S616 the CPU 30 determines whether or not to end the display. When the display is to be ended, the CPU 30 makes a YES determination in step S616 and ends the routine. When the display is not to be ended, the CPU 30 makes a NO determination in step S616 and the process returns to step S600. Consequently, the processes of step S600 to step S616 are repeatedly executed until the display device 14 is turned off.

As described above, according to the image display system according to the eighth embodiment, in addition to the same advantageous effects as those of the first embodiment being obtained, there can be obtained the advantageous effects that the screen is automatically switched and the wide range image is displayed when the vehicle is stopped, such as when waiting at a traffic light, so the needs of the rider wanting to check the rear view image can be met, and the number of times that the rider performs switch operations can be reduced.

Ninth Embodiment

In the eighth embodiment, the screen is switched when it is determined that the vehicle is in a stopped state, but in a ninth embodiment, the screen is switched when it is determined that the vehicle is in a state in which it has started driving. This state can occur when the vehicle starts driving after the vehicle has stopped with the engine left on.

The flow of processes in the image display program according to the ninth embodiment is the same as the flow of processes in the image display program according to the eighth embodiment shown in FIG. 16, except that the display control unit 52 determines, in the vehicle state determination process shown in step S602, whether or not the vehicle is in a state in which it has started driving, and the switch determination unit 50 uses a stable driving state as the trigger detected in step S612.

For example, as described above, when the vehicle speed is 0 km/hour, the gear has been switched from neutral to low, and the clutch is engaged, it can be determined from the detection results of the sensors that the vehicle is in a state in which it has started driving. In other cases, it can be determined that the vehicle is not in a state in which it has started driving. Furthermore, for example, when the vehicle speed exceeds a predetermined vehicle speed, it can be judged from the detection results of the sensors that the vehicle is in a stable driving state. When the switch determination unit 50 detects stable driving of the vehicle as the trigger, the display screen returns to the initial screen.

As described above, according to the image display system according to the ninth embodiment, in addition to the same advantageous effects as those of the first embodiment being obtained, there can be obtained the advantageous effects that the screen is automatically switched and the wide range image is displayed when the vehicle resumes driving after having stopped, such as when waiting at a traffic light, so the rider can be given a heads-up to avoid a rear-end collision or the like, and the number of times that the rider performs switch operations can be reduced.

Figure 17:
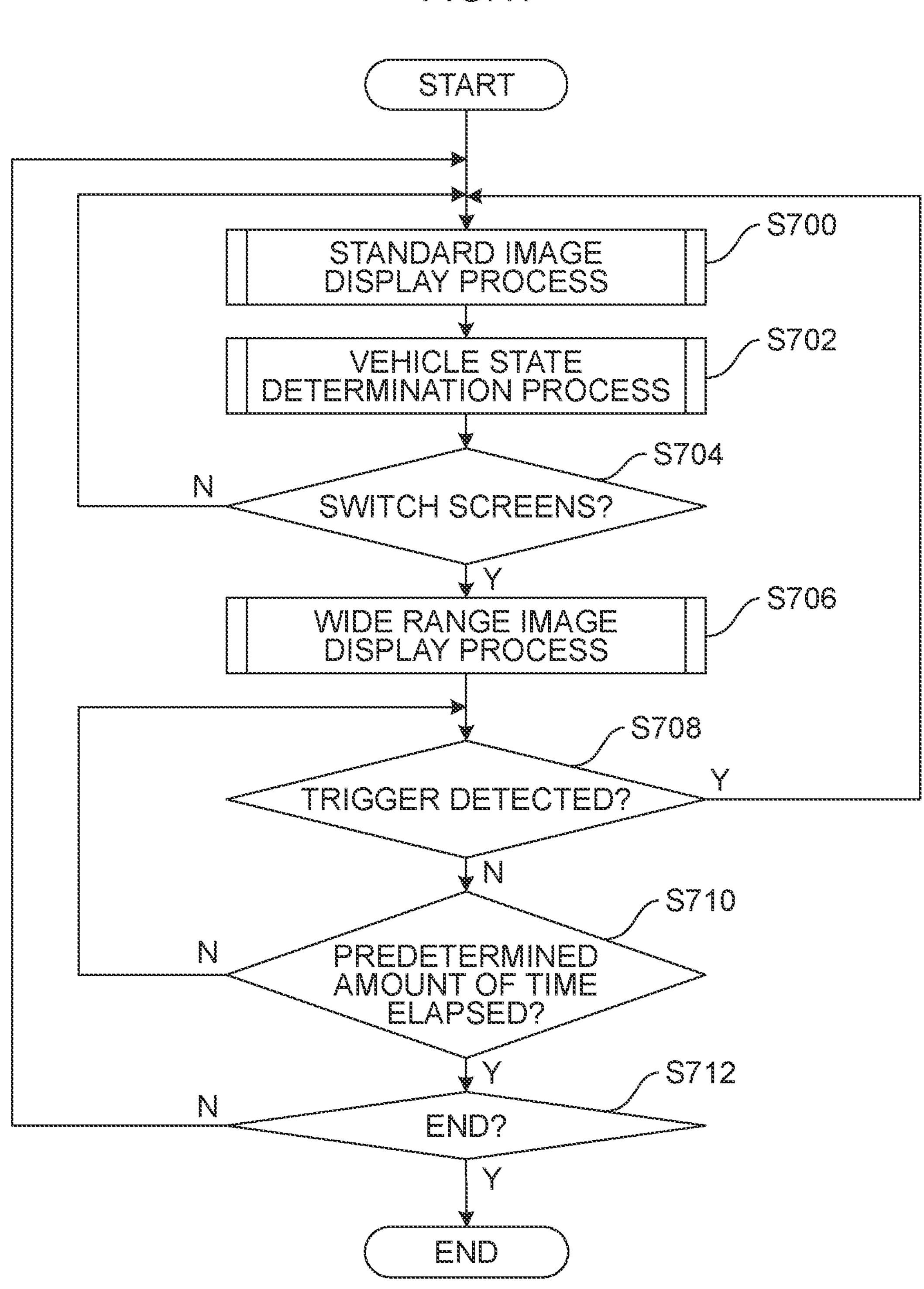
FIG. 17 is a flowchart showing an example modification of the image display program according to the eighth embodiment.

Here, an example modification of the image display program according to the eighth and ninth embodiments will be described with reference to FIG. 17. The image display program according to the example modification is executed by the CPU 30 of the control device 16 and, for example, is started as a result of the rider operating the operation device 18 to give an instruction to display image in a state in which the display device 14 has been turned on.

First, in step S700 the display control unit 52 executes the standard image display process that switches the display screen to a screen that displays the standard image. Next, in step S702 the display control unit 52 executes the vehicle state determination process that determines whether or not the vehicle is in the predetermined vehicle state based on the vehicle information. In the eighth embodiment, the display control unit 52 determines whether or not the vehicle is in a stopped state, and in the ninth embodiment, the display control unit 52 determines whether or not the vehicle is in a state in which it has started driving.

Next, in step S704, the switch determination unit 50 determines whether or not to switch screens. When the vehicle is in the predetermined vehicle state, the switch determination unit 50 determines to switch screens and the process proceeds to step S706. When the vehicle is not in the predetermined vehicle state, the switch determination unit 50 determines to not switch screens and the process returns to step S600. The display control unit 52 repeatedly execute steps S700 and step S702 until it is determined to switch screens.

Next, in step S706 the display control unit 52 executes the wide range image display process that switches the display screen to a screen that displays the wide range image.

Next, in step S708 the switch determination unit 50 determines whether or not it has detected the trigger to switch screens. When the switch determination unit 50 has detected the predetermined trigger in accordance with the predetermined vehicle state, the process returns to step S700. That is, the display control unit 52 causes the display screen to transition from the screen that displays the wide range image to the screen that displays the standard image.

When the switch determination unit 50 has not detected the trigger in step S708, the process proceeds to step S710. Next, in step S710 the switch determination unit 50 determines whether or not a predetermined amount of time has elapsed since switching to the screen that displays the wide range image. When the predetermined amount of time has not elapsed, the process returns to step S708. When the predetermined amount of time has elapsed without the trigger being detected, the process proceeds to step S712.

Next, in step S712 the CPU 30 determines whether or not to end the display. When the display is to be ended, the CPU 30 makes a YES determination in step S712 and ends the routine. When the display is not to be ended, the CPU 30 makes a NO determination in step S712 and the process returns to step S700. Consequently, the processes of step S700 to step S712 are repeatedly executed until the display of the image is turned off.

As shown in this example modification, the display of the initial screen can be omitted.

Furthermore, even if the screen that displays the standard image is displayed without displaying the initial screen, the display screen can be switched to the screen that displays the wide range image based on the vehicle state determination result. It will be noted that in the other embodiments also, the display of the initial screen can likewise be omitted.

Example Modifications

It will be noted that the configurations of the image display system described in each of the above embodiments are examples, and it goes without saying that those configurations may be changed without departing from the spirit of the disclosure.

In the third embodiment, the image display system is configured to switch screens in conjunction with an operation of the turn switch, but the image display system may be configured to switch screens in conjunction with detection results of various sensors. Examples of the various sensors include a blind spot monitor (BSM) that detects the approach of a vehicle from behind the host vehicle, a sensor that detects inclination of the vehicle, and a vehicle speed sensor. For example, the image display system may be configured to switch screens in response to a warning from the BSM.

In the above embodiments, as shown in FIG. 8, the image display system causes the screens to transition so as to form a loop in the order of the initial screen 70, the screen 72 that displays the standard image 71, the screen 74 that displays the wide range image 73, and the initial screen 70. However, the image display system may also cause the screens to transition forward and backward in the order of the initial screen 70, the screen 72 that displays the standard image 71, the screen 74 that displays the wide range image 73, the screen 72 that displays the standard image 71, and the initial screen 70.

In the above embodiments, an example was described where the display device is installed in the meter display of the instrument panel, but it suffices for the display device to be installed in a position in front of a rider in which it is easy for the rider to see it, regardless of whether a meter display is present or not. For example, the display device may be installed on the handle, the part where the mirrors are attached, the upper portion of the fuel tank, inside the cowl, or on the upper side of the meter display.

In the above embodiments, an example was described where the image display system is provided with a dedicated display device, but a mobile information processing device such as a smartphone or a tablet may be used as the display device. In this case, the mobile information processing device uses a dedicated application program installed therein to execute various processes by cooperating with the ECU that is the control device. For example, a smartphone may be wirelessly connected by Bluetooth (registered trademark) to the communication unit 22, and image based on the image data stored in the storage unit 24 can be displayed on the screen of the smartphone (see FIG. 3).

What is claimed is:

1. An image display system, comprising:

rearview optical mirrors of a motorcycle, which is a host vehicle;

an image capture device that captures an image of an area behind the motorcycle;

a display device that is disposed in front of a rider and displays an image based on image data obtained by the image capture device; and a control device which, when the motorcycle is travelling, controls the display device so as to display a first screen that displays a first image corresponding to a first area of an imaging range of the image captured by the image capture device and to thereafter effect a transition from the first screen to a second screen that displays a second image corresponding to a second area that is different from the first area, wherein each of the first area and the second area includes a blind spot area that cannot be seen by the rider in the optical mirrors, and wherein an extent of the blind spot area is set by the rider, wherein the blind spot area is an area where a rearward view is obstructed by the presence of the rider and an extent of the blind spot area is set by the rider in advance.

2. The image display system of claim 1, wherein each of the first area and the second area is a rectangular area wherein a lower side of each area intersects respective side ends of the blind spot area that cannot be seen by the rider in the optical mirrors.

3. The image display system of claim 1, wherein:

the first image is displayed at a magnification that is closer to a magnification of the optical mirrors than a magnification of the captured image, and the second area has a wider area, on a same side as a direction designated by the rider, than the first area.

4. The image display system of claim 1, wherein:

the second area has a wider area on a turn side than the first area, and the control device controls the display device so as to transition from the first screen to the second screen in conjunction with an operation of a turn switch installed in the motorcycle.

5. The image display system of claim 1, wherein:

the second area has a wider area, on a side at which another vehicle has been detected, than the first area, and the control device controls the display device so as to transition from the first screen to the second screen in conjunction with detection results of a blind spot monitor installed in the motorcycle.

6. The image display system of claim 1, wherein the control device controls the display device so as to transition from the first screen to the second screen via at least one third screen that displays a third image corresponding to a third area, that is wider than the first area and narrower than the second area, of the imaging range of the image captured by the image capture device, wherein, during the transition from the first screen to the second screen, the magnification of the image displayed on each screen is gradually increased so that the first image continuously changes to the second image.

7. The image display system of claim 1, wherein, in the second image:

a fourth area corresponding to a maximum width of the blind spot area in the second area is displayed at a same magnification as that of the first image and areas other than the fourth area in the second area are compressed in the vehicle width direction and displayed.

8. The image display system of claim 1, wherein the control device causes a setting screen, for setting the extent of the blind spot area, to be superimposed on the first screen when the host vehicle is stopped, and receives settings from the rider.

9. A display control device that controls a display device arranged together with optical mirrors in front of a rider of a motorcycle, the display control device comprising a memory and a processor coupled to the memory, wherein the processor is configured to:

acquire image data from an image capture device that captures an image of an area behind the motorcycle when the motorcycle, which is a host vehicle, is travelling;

control, based on the acquired video data, the display device so as to display a first screen that displays a first image corresponding to a first area of an imaging range of the image data; and control the display device so as to effect transition from the first screen to a second screen that displays a second image corresponding to a second area that is different from the first area, wherein each of the first area and the second area includes a blind spot area that cannot be seen by the rider in the optical mirrors, and wherein an extent of the blind spot area is set by the rider, wherein the blind spot area is an area where a rearward view is obstructed by the presence of the rider and an extent of the blind spot area is set by the rider in advance.

10. The display control device of claim 9, wherein the display control device causes a setting screen, for setting the extent of the blind spot area, to be superimposed on the first screen when the host vehicle is stopped, and receives settings from the rider.

* * * * *